(12) United States Patent
Snodgrass et al.

(10) Patent No.: US 11,596,867 B2
(45) Date of Patent: Mar. 7, 2023

(54) AI-BASED CONTENT GENERATION FOR GAMING APPLICATIONS

(71) Applicant: modl.ai ApS, Copenhagen K (DK)

(72) Inventors: Sam Snodgrass, Copenhagen S (DK); Vanessa Volz, Copenhagen (DK); Niels Orsleff Justesen, Roskilde (DK); Sebastian Risi, Copenhagen S (DK); Lars Henriksen, Brønshøj (DK)

(73) Assignee: modl.ai ApS, Copenhagen K (DK)

( * ) Notice: Subject to any disclaimer, the term of this patent is extended or adjusted under 35 U.S.C. 154(b) by 137 days.

(21) Appl. No.: 17/159,907

(22) Filed: Jan. 27, 2021

(65) Prior Publication Data

US 2021/0146254 A1    May 20, 2021

Related U.S. Application Data

(63) Continuation-in-part of application No. 16/821,020, filed on Mar. 17, 2020, now Pat. No. 10,918,948.

(60) Provisional application No. 62/969,928, filed on Feb. 4, 2020, provisional application No. 62/967,845, filed on Jan. 30, 2020, provisional application No. 62/966,669, filed on Jan. 28, 2020, provisional application No. 62/946,824, filed on Dec. 11, 2019, provisional application No. 62/946,019, filed on Dec. 10, 2019, provisional application No. 62/820,417, filed on Mar. 19, 2019, provisional application No. 62/820,412, filed on Mar. 19, 2019, provisional application No. 62/820,424, filed on Mar. 19, 2019.

(51) Int. Cl.
| | |
|---|---|
| A63F 13/60 | (2014.01) |
| A63F 13/57 | (2014.01) |
| G06N 7/00 | (2006.01) |
| G06N 20/00 | (2019.01) |

(52) U.S. Cl.
CPC ............. *A63F 13/60* (2014.09); *A63F 13/57* (2014.09); *G06N 7/005* (2013.01); *G06N 20/00* (2019.01)

(58) Field of Classification Search
None
See application file for complete search history.

(56) References Cited

U.S. PATENT DOCUMENTS

| | | |
|---|---|---|
| 7,636,701 B2 | 12/2009 | Funge et al. |
| 8,047,915 B2 | 11/2011 | Lyle |

(Continued)

FOREIGN PATENT DOCUMENTS

| | | |
|---|---|---|
| JP | 6103683 B2 | 3/2017 |
| KR | 101380565 B1 | 4/2014 |

(Continued)

OTHER PUBLICATIONS

Hudlicka, Eva; Affective Game Engines: Motivation and Requirements; Proceedings of the 4th International Conference on Foundations of Digital Games; Apr. 26-30, 2009; 10 pgs.

(Continued)

*Primary Examiner* — Ronald Laneau
(74) *Attorney, Agent, or Firm* — Garlick & Markison; Bruce Stuckman

(57) ABSTRACT

A procedural content generation tool operates by: generating, via image analysis, graphs of existing game content; generating a symmetrical Markov random field (SMRF) model based on the graphs; and automatically generating, via iterative artificial intelligence (AI), new game content based on the SMRF model.

17 Claims, 17 Drawing Sheets
(7 of 17 Drawing Sheet(s) Filed in Color)

(56) References Cited

U.S. PATENT DOCUMENTS

| | | | |
|---|---|---|---|
| 9,579,576 | B2 | 2/2017 | Cao |
| 10,361,975 | B2 | 7/2019 | Borsutksy |
| 10,491,548 | B2 | 11/2019 | Xie |
| 10,511,450 | B2 | 12/2019 | Fung |
| 10,888,788 | B2 | 1/2021 | Osman |
| 2011/0145362 | A1 | 6/2011 | Jones et al. |
| 2014/0152461 | A1 | 6/2014 | Carlson et al. |
| 2018/0083894 | A1 | 3/2018 | Fung |
| 2018/0109526 | A1 | 4/2018 | Fung |
| 2019/0060759 | A1 | 2/2019 | Krishnamurthy |
| 2020/0074805 | A1* | 3/2020 | Selegue ............... G07F 17/34 |
| 2020/0242892 | A1* | 7/2020 | Luciano ............. G07F 17/3267 |
| 2020/0298128 | A1* | 9/2020 | Yannakakis .......... G06N 3/0454 |
| 2020/0380813 | A1* | 12/2020 | Luciano ............... G07F 17/329 |
| 2021/0146254 | A1* | 5/2021 | Snodgrass ........... G06N 3/0454 |

FOREIGN PATENT DOCUMENTS

| | | |
|---|---|---|
| WO | 2006014560 A2 | 2/2006 |
| WO | 2018004839 A1 | 1/2018 |

OTHER PUBLICATIONS

International Searching Authority; International Search Report and Written Opinion; Int'l Application No. PCT/US2020/023290; dated Jul. 13, 2020; 13 pgs.

Makantasis, "From Pixels to Affect: A Study on Games and Player Experience", 2019 8th International Conference on Affective Computing and Intelligent Interaction (ACII) 7 pages, Oct. 15, 2019.

Melhart, "Your Gameplay Says it All: Modelling Motivation in Tom Clancy's The Division", 11 pages, Jan. 31, 2019.

Snodgrass, "Markov Models for Procedural Content Generation", A Thesis Submitted to the Faculty of Drexel University, Mar. 2018, 233 pages.

International Searching Authority; International Search Report and Written Opinion; International Application No. PCT/US2021/015496; dated May 17, 2021; 8 pgs.

Riedl et al.; AI for Game Production; IEEE Conference on Computational Intelligence in Games (CIG); ISSN 2325-4270; 2013; 8 pgs.

Wang, Shiyun; Connection Between Graphical Potential Games and Markov Random Fields with an Extension to Bayesian Networks; ProQuest No. 10785804; May 2018; 43 pgs.

European Patent Office; Extended European Search Report; EP Application No. 20773761.0; dated Oct. 6, 2022; 8 pgs.

Yannakakis, et al.; Artificial Intelligence and Games; Springer; Oct. 6, 2017.

Snograss, Sam; Markov Models for Procedural Content Generation; A Thesis submitted to the faculty of Drexel University; Mar. 2018; 233 pages.

Volz, et al.; Capturing Local and Global Patterns in Procedural Content Generation via Machine Learning; 2020 IEEE Conference on Games (CoG); May 26, 2020; 8 pgs.

* cited by examiner

| Neighborhood Configurations | Tile Probability per Config | | | | |
|---|---|---|---|---|---|
| | E | G | X | Q |
| SSEE | 1 | 0 | 0 | 0 |
| SEEE | 1 | 0 | 0 | 0 |
| SESE | 1 | 0 | 0 | 0 |
| ESEE | 1 | 0 | 0 | 0 |
| EEEQ | 1 | 0 | 0 | 0 |
| EEEE | 0.973 | 0 | 0 | 0.027 |
| EESE | 1 | 0 | 0 | 0 |
| ESEX | 1 | 0 | 0 | 0 |
| EEEQ | 1 | 0 | 0 | 0 |
| ESQE | 1 | 0 | 0 | 0 |
| EQEE | 1 | 0 | 0 | 0 |
| QEEE | 1 | 0 | 0 | 0 |
| EEEX | 1 | 0 | 0 | 0 |
| EESX | 0 | 0 | 1 | 0 |
| EXXS | 0 | 0 | 0.5 | 0 |
| EXES | 0.5 | 0 | 0.5 | 0 |
| EEXS | 0.5 | 0 | 0.5 | 0 |
| EXSS | 0 | 0 | 1 | 0 |

FIG. 11F

| Neighborhood Configurations | Times Each Tile Encountered per Config | | | | |
|---|---|---|---|---|---|
| | E | G | X | Q | Sum |
| SSEE | 1 | 0 | 0 | 0 | 1 |
| SEEE | 8 | 0 | 0 | 0 | 8 |
| SESE | 1 | 0 | 0 | 0 | 1 |
| ESEE | 4 | 0 | 0 | 0 | 4 |
| EEEQ | 1 | 0 | 0 | 0 | 1 |
| EEEE | 37 | 0 | 0 | 1 | 38 |
| EESE | 5 | 0 | 0 | 0 | 5 |
| ESEX | 1 | 0 | 0 | 0 | 1 |
| EEEQ | 1 | 0 | 0 | 0 | 1 |
| ESQE | 1 | 0 | 0 | 0 | 1 |
| EQEE | 1 | 0 | 0 | 0 | 1 |
| QEEE | 6 | 0 | 0 | 0 | 6 |
| EEEX | 1 | 0 | 0 | 0 | 1 |
| EESX | 0 | 1 | 0 | 0 | 1 |
| EXXS | 0 | 0 | 4 | 0 | 4 |
| EXES | 1 | 0 | 1 | 0 | 2 |
| EEXS | 1 | 0 | 1 | 0 | 2 |
| EXSS | 0 | 0 | 1 | 0 | 1 |

FIG. 11E

AI-BASED CONTENT GENERATION FOR GAMING APPLICATIONS

CROSS REFERENCE TO RELATED PATENTS

The present U.S. Utility Patent Application claims priority pursuant to 35 U.S.C. § 119(e) to U.S. Provisional Application No. 62/969,928, entitled "AI-BASED CONTENT GENERATION FOR GAMING APPLICATIONS", filed Feb. 4, 2020, and also claims priority pursuant to 35 U.S.C. § 120 as a continuation-in-part of Ser. No. 16/821,020, entitled "GAME BOT GENERATION FOR GAMING APPLICATIONS", filed Mar. 17, 2020, which claims priority pursuant to 35 U.S.C. § 119(e) to U.S. Provisional Application No. 62/820,424, entitled "FLEXIBLE PLAY TRACE REPLAY FOR REGRESSION TESTING OF GAME CONTENT", filed Mar. 19, 2019; U.S. Provisional Application No. 62/820,412, entitled "OVERALL PIPELINE FOR EXPERIENCE DRIVEN AUTOMATIC GAME TESTING AND PROCEDURAL CONTENT GENERATION WITH PROCEDURAL PERSONAS", filed Mar 19, 2019; U.S. Provisional Application No. 62/820,417, entitled "BEHAVIOR AND EXPERIENCE MODELING WITH PREFERENCE LEARNING", filed Mar. 19, 2019; U.S. Provisional Application No. 62/946,019, entitled "BEHAVIOR AND EXPERIENCE MODELING WITH PREFERENCE LEARNING", filed Dec. 10, 2019; U.S. Provisional Application No. 62/946,824, entitled "PIXEL-BASED EXPERIENCE MODELING FOR GAMING APPLICATIONS", filed Dec. 11, 2019; U.S. Provisional Application No. 62/966,669, entitled "VIEWER EXPERIENCE MODELING FOR GAMING APPLICATIONS", filed Jan. 28, 2020; and U.S. Provisional Application No. 62/967,845, entitled "MULTIMODAL EXPERIENCE MODELING FOR GAMING APPLICATIONS", filed Jan. 30, 2020, all of which are hereby incorporated herein by reference in their entirety and made part of the present U.S. Utility Patent Application for all purposes.

TECHNICAL FIELD

The present disclosure relates to processing systems and applications used in the development of gaming applications used by gaming systems and other gaming devices.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

FIGS. 10A and 10B present graphs in accordance with embodiments of the present disclosure.

FIG. 11E presents a table of accumulated configurations in accordance with the present disclosure.

FIG. 11F presents a table of conditional probabilities in accordance with the present disclosure.

DETAILED DESCRIPTION

Figure 1:
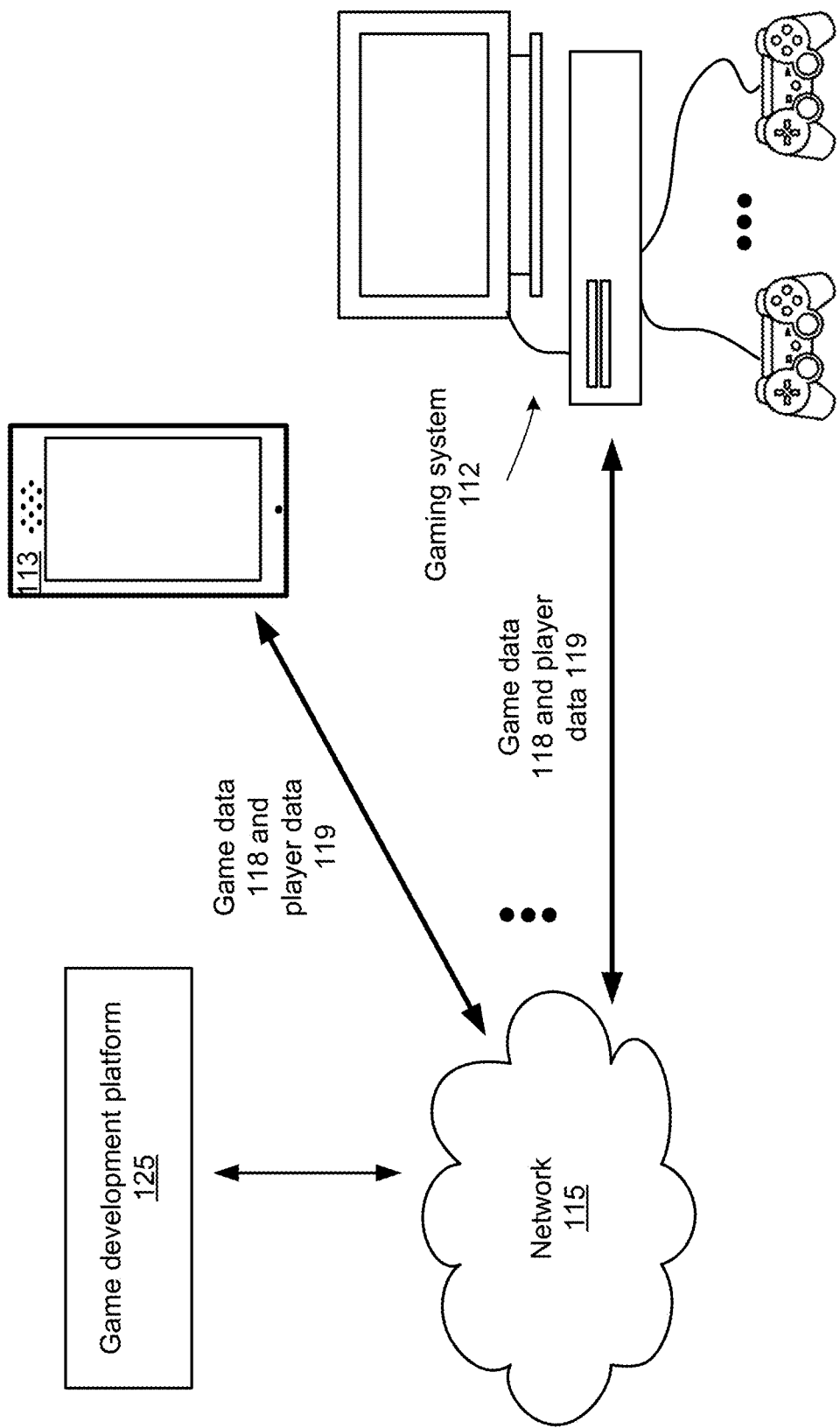
FIG. 1 presents a pictorial/block diagram representation of a game development system in accordance with an embodiment of the present disclosure.

FIG. 1 presents a pictorial/block diagram representation of a game development system in accordance with an embodiment of the present disclosure. In particular, a game development platform 125 is presented that communicates game data 118 and player data 119 via network 115 with gaming devices such as mobile device 113 and gaming system 112 via network 115. The network 115 can be the Internet or other wide area or local area network. The game development system 125 can be used in the creation, development, testing, balancing and updating of a gaming application.

The game data 118 can include, for example, a current version of a gaming application that is presented to the gaming devices for play. Furthermore, the game data 118 sent from the gaming devices to the game development platform 125 can include game telemetry data or be processed to produce game telemetry data and/or other game analytics used in game development. The player data 119 can include one or more modes of output such as player or viewer verbal data generated by a microphone associated with the gaming system 112 or 113, chat data associated with a player or viewer and/or non-verbal data of a player or viewer such as facial expression, head pose, that is captured via a camera or other imaging sensor associated with the gaming system 112 or 113 that indicates, for example, player and/or viewer emotions.

The operation of the game development platform 125 will be described in greater detail in conjunction with FIGS. 2-12, including several optional functions and features and examples thereof.

Figure 2:
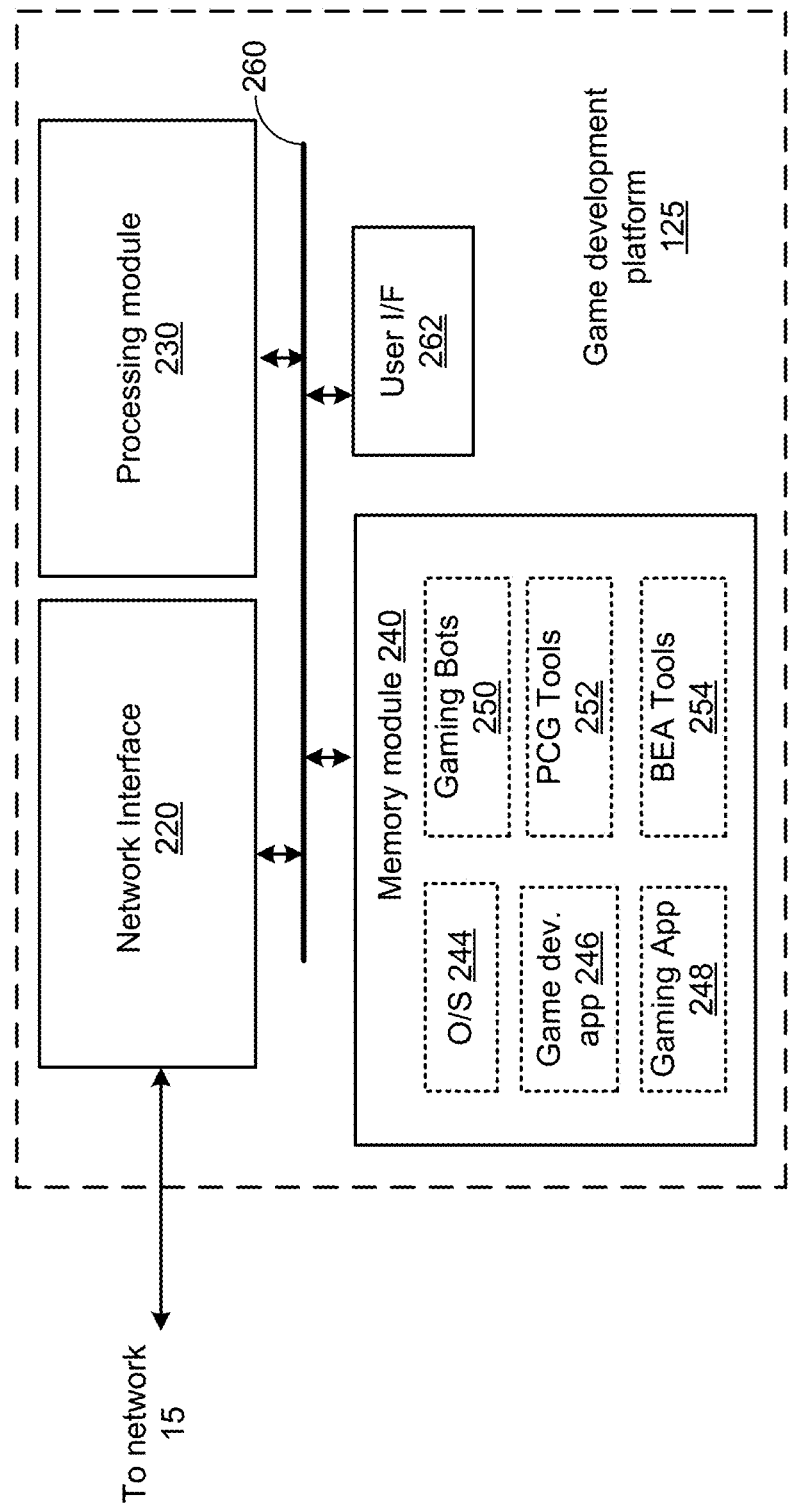
FIG. 2 presents a block diagram representation of a game development platform in accordance with an embodiment of the present disclosure.

FIG. 2 presents a block diagram representation of a game development platform in accordance with an embodiment of the present disclosure. In particular, the game development platform 125 includes a network interface 220 such as a 3G, 4G, 5G or other cellular wireless transceiver, a Bluetooth transceiver, a WiFi transceiver, UltraWideBand transceiver, WIMAX transceiver, ZigBee transceiver or other wireless interface, a Universal Serial Bus (USB) interface, an IEEE 1394 Firewire interface, an Ethernet interface or other wired interface and/or other network card or modem for communicating for communicating with one or more gaming devices via network 115.

The game development platform 125 also includes a processing module 230 and memory module 240 that stores an operating system (O/S) 244 such as an Apple, Unix, Linux or Microsoft operating system or other operating system, a game development application 246, one or more gaming applications 248, one or more gaming bots 250, one or more procedural content generation (PCG) tools 252, and one or more behavioral experience analysis (BEA) tools 254. In particular, the O/S 244, game development application 246, gaming application 248, gaming bots 250, PCG tools 252 and BEA tools 254 each include operational instructions that, when executed by the processing module 230, that cooperate to configure the processing module into a special purpose device to perform the particular functions described herein.

The game development platform 125 also includes a user interface (I/F) 262 such as a display device, touch screen, key pad, touch pad, joy stick, thumb wheel, a mouse, one or more buttons, a speaker, a microphone, an accelerometer, gyroscope or other motion or position sensor, video camera or other interface devices that provide information to a user of the game development platform 125 and that generate data in response to the user's interaction with the game development platform 125.

The processing module 230 can be implemented via a single processing device or a plurality of processing devices. Such processing devices can include a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory 240. The memory module 240 can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 260, other architectures are possible including additional data buses and/or direct connectivity between one or more elements. Further, the game development platform 125 can include one or more additional elements that are not specifically shown.

The game development application 246 can be used by a game developer in the creation, development, testing, balancing, improving, revision, optimizing and/or updating of the gaming application 248. The gaming application 248 can be, for example, a multiplayer or single player game including a shooter or other combat game, fantasy game or other action or adventure game, a simulation game that simulates the operation of a real-world vehicle device or system, a realtime strategy game, a puzzle, a sports game, role-playing game, board game or other video or digitally animated game. In various embodiments, one or more versions of the gaming application 248 can be stored including, for example, multiple versions or updates of the gaming application, one or more sets of game parameters, one or more levels and other content and/or other gaming data.

The gaming bots 250 operate in conjunction with the game development application 246 to test the operation of the gaming application 246 and/or to operate as one or more non-player characters (NPCs) in the game. The gaming bots 250 can include and/or operate as game playing AI (artificial intelligence) personas that are constructed and implemented via a machine learning algorithm and that operate, for example, as automatic testers designed to represent specific play-styles or skill levels. These AI personas can be used, for example, to progress through a game much faster than an actual player to evaluate game content more quickly; to assess the difficulty of levels with randomness with thousand variations of playthroughs; to generate key performance indicators (KPIs), to increase the speed of design iteration, to free up designers' time to focus on gameplay and high level concepts; to test with the same skill level and style again and again, for example, through various versions an/or iterations of a gaming application 248. The use of artificial, rather than human intelligence, allows the gaming bots 250 to perform with a speed and consistency that cannot practically be performed in the human mind.

Furthermore, one or more of the AI personas can operate as regression play-testers that play games based on machine learning on recorded human demonstrations and check that the game is still playable after content or code changes. In particular, the regression play-testers can generate a report when errors are found in the game, generate KPIs, predict changes to overall play time and game difficulty and/or operate in conjunction with BEA tools 250 to predict changes to the amount of player behavioral motivation, both positive and negative, including boredom, excitement, completion, etc.

As indicated above, the AI personas can work as player stand-ins, AI opponents, and/or NPCs for single and multiplayer games. This allows a game developer to make sure there is always someone to play against and to imitate actual opponents, before and after launch; challenge players with opponents that vary in skill level and style; and generate a living, convincing world with characters that vary in behavioral patterns.

The PCG tools 252 use procedural content generation such as procedural content generation via machine learning (PCGML) or other AI to kick-start and accelerate the creative processes of the game developer in the use of the game development application 246 in the development of new gaming applications 248 and/or new content or levels to existing gaming applications. The PCG tools 252 can be constructed via a machine learning algorithm and include, for example, Markov random field models, symmetrical Markov random field models, a convolutional neural network, stacking neural networks, a generative adversarial network, deep learning algorithm, un-supervised learning algorithm, Hastings Metropolis sampling or other artificial intelligence model or methodology that is iteratively trained based on the analysis of prior versions of a game, game data 118 such as game telemetry data, behavioral motivation data and/or game play by one or more AI personas and operates to generate new game content such as new game variations, new levels, and other content.

In various embodiments, game playing AI personas can evaluate and critique content generated via PCG by generating AI persona play-traces and statistics across game content and evaluate procedurally generated content in terms of predicted KPIs and/or other performance metrics. This allows the game development application 246 to assist the game developer in understanding and evaluating the play-space of a PCG enabled game, to protect a PCG design from unplayable or degenerate examples.

Furthermore, the PCG tools 252 can generate new puzzles, levels or other content by learning from examples provided by the game developer to the game development platform 125 to seed the artificial intelligence model and generate new candidate content for evaluation. This allows game developers using the game development platform 125 to increase their productivity with pre-generated puzzles, levels and/or other content; to focus on concepts and important details rather than mundane layouts; to start creating from generated examples instead of a blank canvas, and/or generate content in the style and preferences learned from prior game developer based on the seed examples provided by the game developer to the game development platform 125.

The BEA tools 254 operate in conjunction with the game development application 246 to automatically predict player motivations and other player experiences from play traces of players in realtime. Furthermore, the use of BEA tools 254 in combination with gaming bots 250 and/or PCG tools 252 allows a game developer to predict, based on simulated game play, future player motivations and other player experiences from play traces of AI personas.

This use of the game development platform 125 assists the game developer in understanding why players like a particular gaming application 248, reduce churn, optimize player experiences and long-term engagement. In particular, potential game players are different and play for different reasons. Predicting player motivations helps the game developer to understand these differences and groupings across a potential player base.

The BEA tools 254 can be constructed via preference learning or other machine learning techniques that are trained based on player questionnaires, game data 118 and/or player data 119 in order to learn and predict actual player motivations. In operation, the BEA tools 254 use game telemetry data, game data 118 and/or player data from other players to predict individual players' reasons for interacting with a game. For example, generating BEA data that indicates to which degree players are motivated by motivation factors allows a game developer to optimize the player experience accordingly, to match players according to their motivations, creating better play sessions, to optimize and individualize games to a player, retaining players and improving life-time value, to identify poor player matches and potential negative interactions before they become a problem, to track developments in your player base over time and know day-by-day if your typical player motivation or behavioral profile starts changing.

Consider the following case examples.

Case#1

Background

A game developer is using the game development platform 125 to develop gaming application 248 that is a multiplayer mobile game.

The game features two opposing, teams each with up to four characters, playing a form of fantasy American football.

The characters that a player can use are taken from a larger pool, available to the player, and built into a "deck" for specific matches.

Each of the characters have different abilities that radically alter the player experience. Combining different characters in different decks will give players different teams.

Additionally each character can be tuned indefinitely in terms of combinations of health values, damage, speed, etc.

It is important to understand how these different decks play against each other, to ensure that the game is well balanced and that players are incentivized to acquire more characters as they play the game.

The game developer plans to continuously develop new characters and release new ones periodically, following the initial launch.

Additionally, the game developer plans to develop and release new playing fields, that change the properties of the gameplay, again impacting the play value of a particular deck.

Needs

The game developer needs to understand the play properties of each of the characters, both alone and when combined with other characters in a deck.

This means the game developer needs to understand that different characters perform dynamically against each other in the game during gameplay.

This means playing many games with different character deck configurations and observing and analyzing the impact of various play styles and strategies with various combinations.

The game features 18 characters and in addition to choosing four characters, players can choose between 4 spells they can add to their deck.

This means that the current version of the game supports 293,760 different deck combinations where the properties of the characters and spells could vary indefinitely.

As each match is played with two decks (which could be the same) there are 86,294,937,600 different matches that can be setup and played before tuning any game values.

In addition to this, different game maps further increase the complexity.

This combinatorial problem with continue to expand as more characters and maps are added to the game.

The game developer wants to explore the properties of as many different deck solutions and match combinations as possible to optimize the gameplay and ensure a product with high retention that monetizes well, in order to maximize customer lifetime value (LTV).

Use of the Game Development Platform 125

Playing a single match to investigate the properties of a character and a deck currently takes about 5 minutes for two people each who need to coordinate in order to be able to play at the same time.

Playing a single match to investigate the properties of a character and a deck currently takes 20-25 seconds for two gaming bots 250.

In addition to being 15 times faster than using human players, the gaming bots 250 allow many matches to be executed in parallel, the data aggregated, and compared using statistics, rather requiring qualitative interpretation.

Game developers who which to qualitatively inspect a character can do so playing against gaming bots 250, reducing the human labor involved by 50% and freeing employee time for other tasks, while removing the need for scheduling between two employees.

Additionally, gaming bots 250 can be included in the finished game as NPCs to face the player. This removes the need for the game developer to separately develop a player facing AI internally, and improves the game's hard launch by providing an unlimited number of opponents for new players, as the game developer is building their player base.

Case#2

Background

The game developer has an existing gaming application 248 that implements a puzzle game.

Keeping the game fresh to players requires continuous production of new content.

The new content needs to be of high quality.

Content is not interchangeable: The game developer reports from analytics that differences in level quality has a major impact on customer lifetime value—good levels are the key component to retaining players.

The current team for creating new levels consists of 2-3 level designers creating new levels.

Previously the designers could produce 15 new levels released into the game every two weeks. Evaluating these levels with an external playtest company took 1 week.

Reducing iteration time allows designers to focus on new features that increase the quality of the levels which is the main predictor of the game's performance.

Needs

The game developer would like algorithms for automatically generating new level concepts, for designers to choose from, to allow designers to focus on novel level ideas rather than the mundane aspects of constructing level designs.

The game developer would like to use automatic content generation to spark new ideas with designers—addressing "the blank canvas problem"—i.e. starting on ideas from scratch.

The game developer would like bots that play more like humans, in order to improve their evaluation of designer-created levels.

Use of the Game Development Platform 125

With automated playtesting by one single gaming bot 250, this rate can be increased to 30 finished levels every 1 week. Evaluating levels is almost instant, allowing designers to iterate while their ideas are fresh.

Case#3

Background

The game developer is developing a gaming application 248 that implements a multiplatform narrative game for PC, Mac and PlayStation 4.

The game is a highly complex branching narrative, consisting of around 8 hours worth of gameplay for a full playthrough.

Needs

The elements of the game are highly interdependent.

Changing an early part of the story may have repercussions in later parts of the story and make the game impossible to complete.

Changing code to address needs identified later in development or to fix bugs can break functionality in earlier parts of the game.

The team size is limited and does not have a full time Quality Assurance person on the team.

When bugs are encountered by non-programmer team members, their work often stops as a consequence, due to not being able to test the game or experience the content as they are creating it.

This breaks creative flow and significantly increases the time to iterate on story ideas.

Asking programmers for urgent bug-fixes tends to break programmers' work-flow, thus having knock-on cost effects.

Testing the full game in response to changes takes at least 8 hours of full time work, plus logging, case creation, and derived tasks.

The game developer needs a solution to automatically identify failure points in traversing the story content of the game.

Use of the Game Development Platform 125

Game bots 250 automatically walking through the story of the game, allowing the game developer to identify when the game would crash or the player would get stuck.

The system operates in two fashions:

1. Through player imitation, game bots 250 simulate previous player action to validate that previous demonstrations still are possible following changes to game code or content.

2. Game bots 250 automatically search through be game, walking through the story lines, looking for crash situations and or dead ends.

This implementation of the game development platform 125 has three benefits:

1. The game development platform 125 can continuously verify that the game works following changes.

2. The game development platform 125 can continuously verify that the game is completable.

3. The game development platform 125 can indefinitely play the game, enabling stress testing that simulates human interactions and provides more realistic use case than simply letting the game run with no input.

The game development platform 125 roughly replaces the effort of one QA employee.

For a team of approximately 10 individuals, this corresponds to roughly 7% savings in terms of budget following initial implementation.

Additionally, the game development platform 125 provides improvements in creative efficiency, leading to higher quality content, which can positively impact the final game performance.

Case#4

Background

A game developer has implemented an infinite runner game.

Needs

It is difficult to know the players when the player base is very large.

Only about 5% of the player complete a game.

The game designer's goal is to have most players complete a game.

Use of the Game Development Platform 125

The use of BEA tools 254 can determine realtime player experience and help improve came completion and player retention.

Figure 3A:
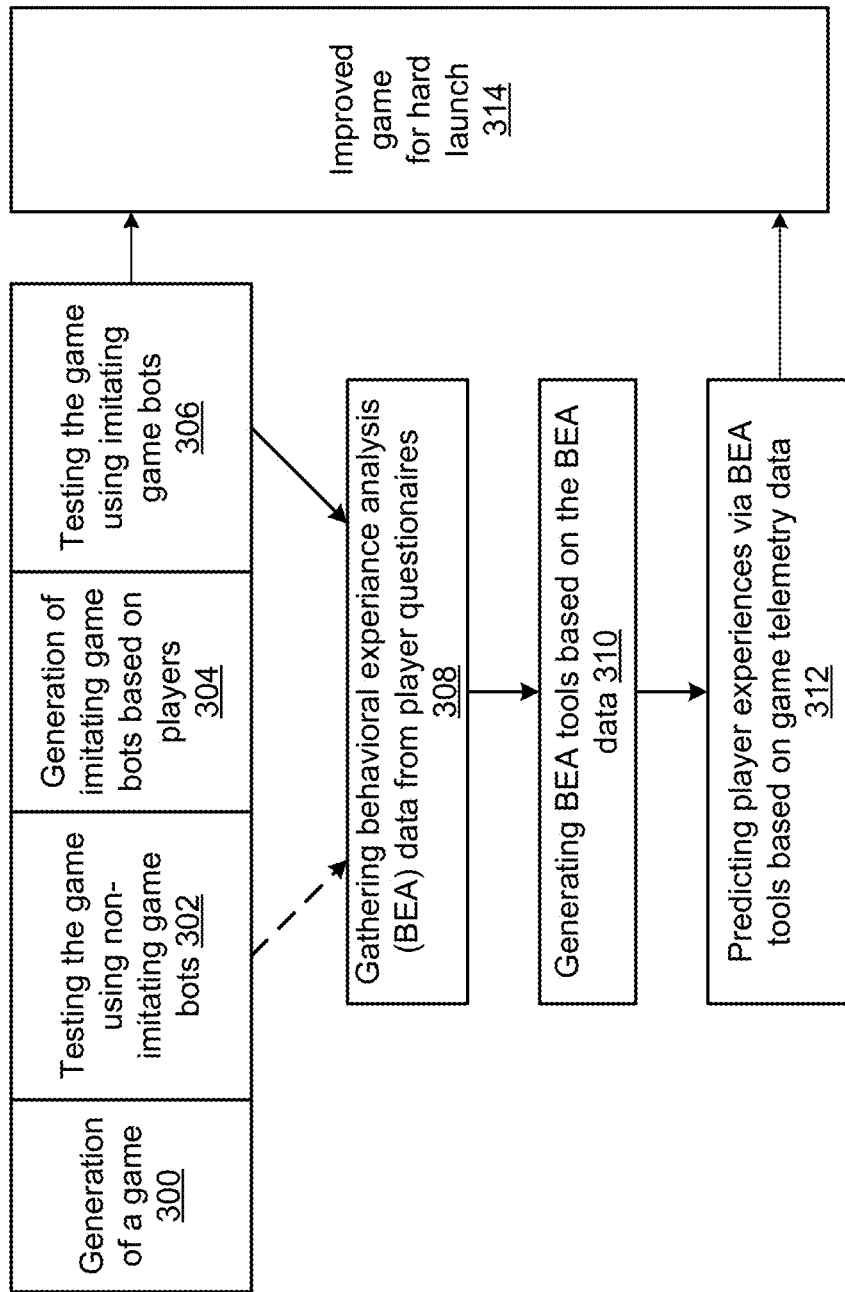
FIG. 3A presents a flow/block diagram representation of a game development pipeline in accordance with an embodiment of the present disclosure.

FIG. 3A presents a flow/block diagram representation of a game development pipeline 325 in accordance with an embodiment of the present disclosure. This game development pipeline 325 operates in conjunction with the game development platform 125 of FIGS. 1 and 2 and uses one or more of the functions and features described therewith. In particular, a game development pipeline is presented where game development progresses temporally from the initial generation of a game in step 300 through, for example, alpha testing, beta testing and/or soft launch and leading to the generation of an improved game for hard launch in step 314.

In step 300, a game, such as an initial version of a gaming application 248 is generated. In various embodiments, the initial version of the game is developed by the game developer using the game development application 246, either from scratch or from initial game content generated by PCG tools 252 based on, for example, prior games or prior versions of the game developed by the game developer.

In step 302, the game is tested using game bots 250 that are non-imitating, e.g. that are developed and trained from testing and evaluation of prior games or prior versions of the game developed by the game developer. In various embodiments, the game bots 250 include a library of non-imitating game bots along with descriptive metadata that indicates, for example, the source, prior use, corresponding player motivations and/or other characteristics of each game bot. The game developer can select and evaluate one or more existing game bots that are used for this testing. Once one or more of the game bots 250 is selected, the game can be tested and improved to, for example, identify dead-ends, and begin to balance the game, increase playability, etc.

In step 304, imitating game bots 250 are generated based on game telemetry data from actual players, such as internal or external players used in testing prior to hard launch. In various embodiments game telemetry data can include data gathered from play traces that can include, for example, game output including audio and pixel data, player input, game status, game events, game achievements, progress toward game goals, game parameters, KPIs and other game analytics.

In various embodiments, the game bots 250 operate via a machine learning algorithm that is trained via the game telemetry data from actual players. Examples of such machine learning algorithms include artificial neural networks (or more simply "neural networks" as used herein), support vector machines, Bayesian networks, genetic algorithms and/or other machine learning techniques that are trained via unsupervised, semi-supervised, supervised and/or reinforcement learning and can further include feature learning, sparse dictionary learning, anomaly detection, decision trees, association rules and/or other processes.

In step 306, the game is further tested and improved by monitoring output, such as game telemetry data including, for example, KPIs and other game analytics generated by play of the game by the game bots 250. In this fashion, various versions of the game can be tested, evaluated and improved to, for example, identify dead-ends, further balance the game, further increase playability, optimize predicted player retention, etc.

In step 308, BEA data is gathered from game data, player questionnaires or other experience metrics that includes various player motivations that can be, for example, correlated to KPIs, game events, player behaviors, game status, game achievements, progress toward game goals, game parameters, and other game analytics. Player motivations can be broad motivation factors such as competence, autonomy, relatedness, and presence. In addition or in the alternative, player motivations and behaviors can be game-related, including competition, completion, fantasy, destruction, discovery, strategy, excitement, power, including more specific motivations such as achieving a high score, being constantly challenged, being challenged with some other frequency, reaching game goals and achievements, completing levels, relaxing, beating other players or spoiling other players games, cheating, avoiding other players that cheat, and other play styles, etc.

In step 310, the BEA data is used to train one or more BEA tools. As previously discussed, the BEA tools 254 can be constructed via preference learning or other ordinal machine learning techniques that are trained based on the BEA data in order to learn and predict actual player motivations.

In step 312, player experiences can be predicted via the BEA tools based on game telemetry data from actual players and/or imitating or non-imitating game bots 350, automatically and in realtime. This player experience data can be used in conjunction with game bot testing in step 306 to further improve the game in step 314 for hard launch, for example, by improving predicted player satisfaction with a game, increasing predicted player retention, and/or increasing predicted revenue generation.

While the game development pipeline 325 has been described that corresponds to the testing, analysis and refinement of an initial version of the game to an improved game for hard launch, one or more steps in the game development pipeline 325 can also be used to similarly process new versions, updates and/or new content additions to a gaming application 248. Furthermore, while the game development pipeline 325 has been described as including step 308 of gathering BEA data and step 310 of generating BEA tools 254 based on the BEA data, in circumstances where the game development platform 125 is used to process similar games, new versions, updates and/or new content additions to a gaming application 248, one or more BEA tools 254 generated from prior versions of the game or from similar games can be selected to for reuse. For example, the BEA tools 254 include a library of BEA tools along with descriptive metadata that indicates, for example, the source, prior use, and/or other characteristics of each BEA tool. The game developer can select and evaluate one or more existing BEA tools 254 that are used in step 312 to predict player experiences including motivations and/or behaviors and other experiences based on game telemetry data from external players.

In addition, consider the following further example for obtaining computational models of player experience that are generative and general (e.g. "general experience personas"). The personas are generative as they are able to simulate the experience of players which is provided as human experience demonstrations. This process is also general across the various instantiations of a particular domain that involves the digitization and simulation of human experience.

To obtain general experience personas, game development platform 125 can fuse innovations on three aspects of a computational model: the input of the model, the computation, and the output of the model. This approach can build on anchoring methods of psychology according to which humans encode values in a comparative (relative) fashion. Based on an innovative ordinal modeling approach, personas perceive humans (or their demonstrations) via generalizable features and they gradually machine learn to experience the environment as humans would do.

The game development platform 125 solves a fundamental problem of psychometrics and human psychology at large: to measure experience computationally in a reliable and valid way. It also addresses a core question of human computer interaction and player experience research: how to simulate experience in simulated worlds the same way humans would feel it. Finally, it solves a traditional problem at the intersection of machine learning and affective computing: how can we learn the most out of less data of a subjective nature.

Figure 3B:
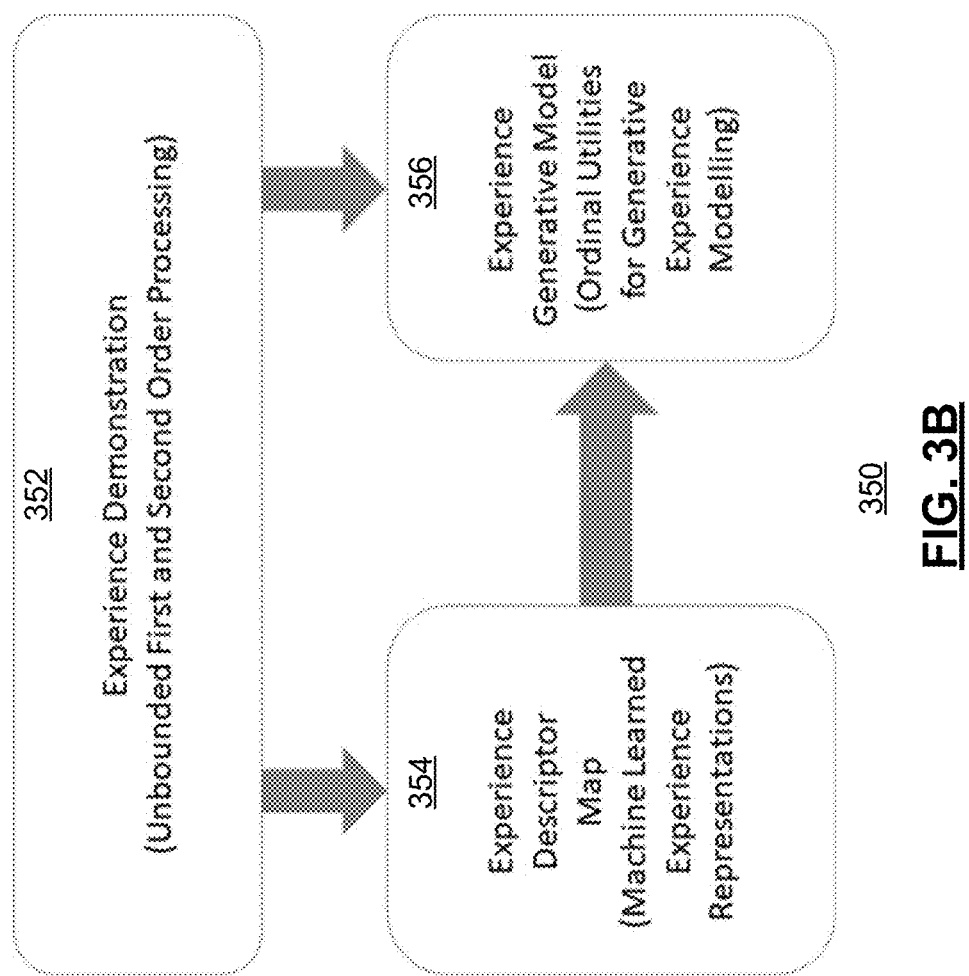
FIG. 3B presents a flow/block diagram representation of a components of the general experience personas in accordance with an embodiment of the present disclosure.

FIG. 3B presents a flow/block diagram 350 representation of a components of the general experience personas in accordance with an embodiment of the present disclosure. In particular, a method is presented for use with any of the functions and features described in conjunction with FIGS. 1, 2 and 3A. This process offers a reliable and effective solution to the generative modeling of player experience (including, for example, motivations and/or behaviors) by combining innovations across the three core subprocesses: the input (descriptor map), the computation per se (generative model), and the output (demonstration).

Step 352—Experience Demonstration: the proposed approach for processing the output of the persona is general as it may support any annotation type from traditional psychometrics. It can differ from prior approached, for example, in the way experience labels are collected and processed. In particular, human demonstrations of experience can be collected in a continuous fashion via engagement metrics that are extracted from an interaction. That includes the spectrum all the way from the passive observation of a video (e.g. a gameplay video) to the active annotation of any interaction (e.g. a game). Experience labels are processed in an ordinal and unbounded fashion thereby allowing the construction of value-agnostic and general experience models. By following first-order and second-order combinatorial techniques we can both yield valid and reliable human demonstrations of experience but also generate large datasets from limited data. Questionnaires of any type—the dominant state of practice within human computer interaction—are no longer needed (even though questionnaire data can still be processed) and human participation is only limited to realistic small-scale player group sizes.

Step 354—Experience Generative Model: experience personas can either learn to predict the experience of a human or even express the experience as a human would do. For the former, the game development platform involves methods of deep (preference) learning that learn to predict the global or partial order of labelled experience. For the latter, the order of human demonstrations (as from above) defines the utility a reinforcement learning approach (e.g. neuro-evolution, stochastic tree search) will learn to infer. The result is a generative model of experience that is able to "feel" in the simulated environment as a human player would do.

Step 356—Experience Descriptor Maps: experience is perceived in the ways interaction is performed and bounded by the experience labelling. The model of perception focuses on areas of labelled experience that are meaningful for the model and eliminates areas that no change is observed or reported with regards to experience. The representation of experience is learned by observing generic aspects of interaction, namely general experience descriptor maps. The design of the maps may vary from high level behavior characterizations to sequential patterns of interaction to detailed latent variables that map to labels of experience. The latter are constructed through simulations of interactions directly when that is possible or indirectly through machine learned forward models of interactions when access to the code that generates the interaction is not available.

In addition to mere game development, the BEA tools 254 of the game development platform 125 can be incorporated into the final game itself. In this fashion, individual players can be assessed in terms of their motivations and/or behaviors. In various embodiments, a particular game version or game parameter setting can be selected from a library of possible game versions/settings for an individual player in order to complement or otherwise match the particular motivations and/or behaviors predicted to correspond with the individual player in order to, for example, improve the experience for a particular player. In this fashion, a player who likes challenges can be challenged, a player who like completion can be given a game that is easier to complete, etc.

Furthermore, the BEA tools 254 of the game development platform 125 can be employed to pair players together in a multiplayer game based on their respective motivations and/or behaviors. For example, a valuable player who, based on a determination by the BEA tools, likes to play the spoiler can be retained by routinely pairing him or her with less-experienced players to foil. In another example, a player, determined to cheat by the BEA tools can be paired with other such players or players who are cheat neutral, avoiding other players who are determined to be demotivated by opposing players who cheat, etc.

While described above in the conjunction with generating BEA data for games, the techniques described above can apply in other industries as well. Being able to both model and generate the experience of people can be used any research domain or industrials sector involving human behavior and experience. The list of potential applications of the process is vast and includes sectors such as creative industries, marketing, retailing, web services, architecture and built environment, cyber physical systems, automobile industry, and the digital arts. Generative and general experience personas not only leverage the ability to test, develop and offer services faster and more efficiently. They also enable better (persona-driven) decisions all the way from ideation to prototyping, production, and release of a service, a project or an object that humans would interact with.

Figure 4:
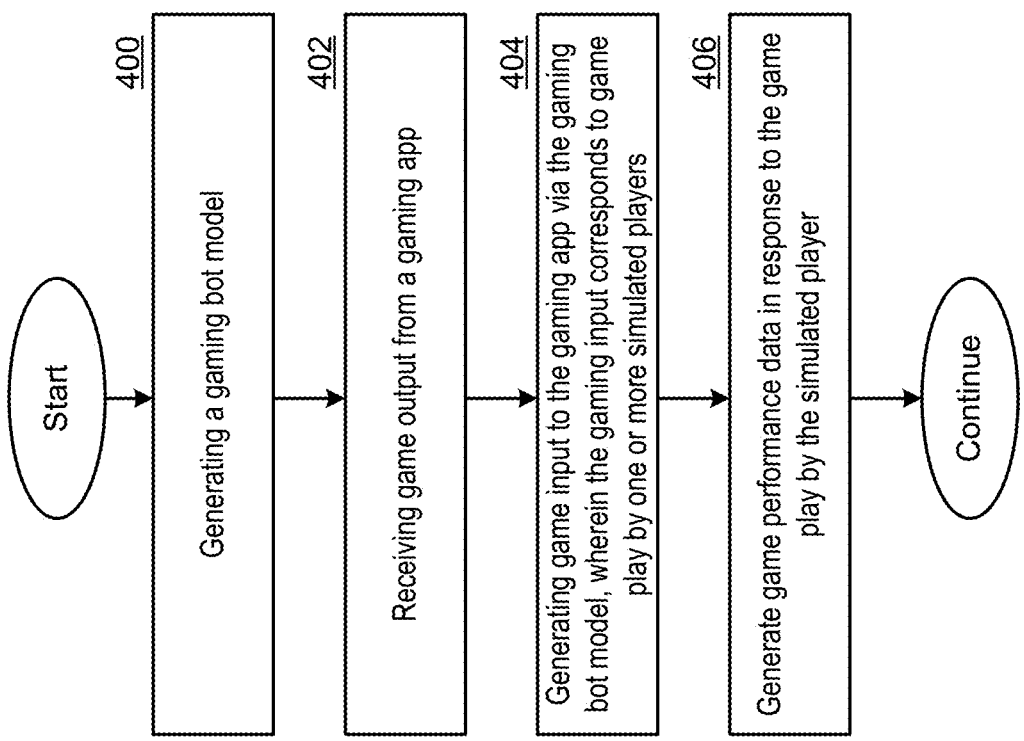
FIG. 4 presents a flowchart representation of a method in accordance with an embodiment of the present disclosure.

FIG. 4 presents a flowchart representation of a method in accordance with an embodiment of the present disclosure. In particular, a method is presented for use with any of the functions and features described in conjunction with FIGS. 1-2, 3A and 3B. In step 400, a gaming bot model is generated that corresponds to a gaming bot, such as any of the gaming bots 350 previously described.

Step 402 includes receiving game output from a gaming application (app) such as gaming application 348. Step 404 includes generating game input to the gaming app via the gaming bot model, wherein the gaming input corresponds to game play by one or more simulated players. Step 406 includes generating game performance data in response to game play by the simulated player. This game performance data can be used to evaluate game content more quickly; to assess the difficulty of levels with randomness with thousand variations of playthroughs; and can include key performance indicators (KPIs) or other game analytics.

Figure 5:
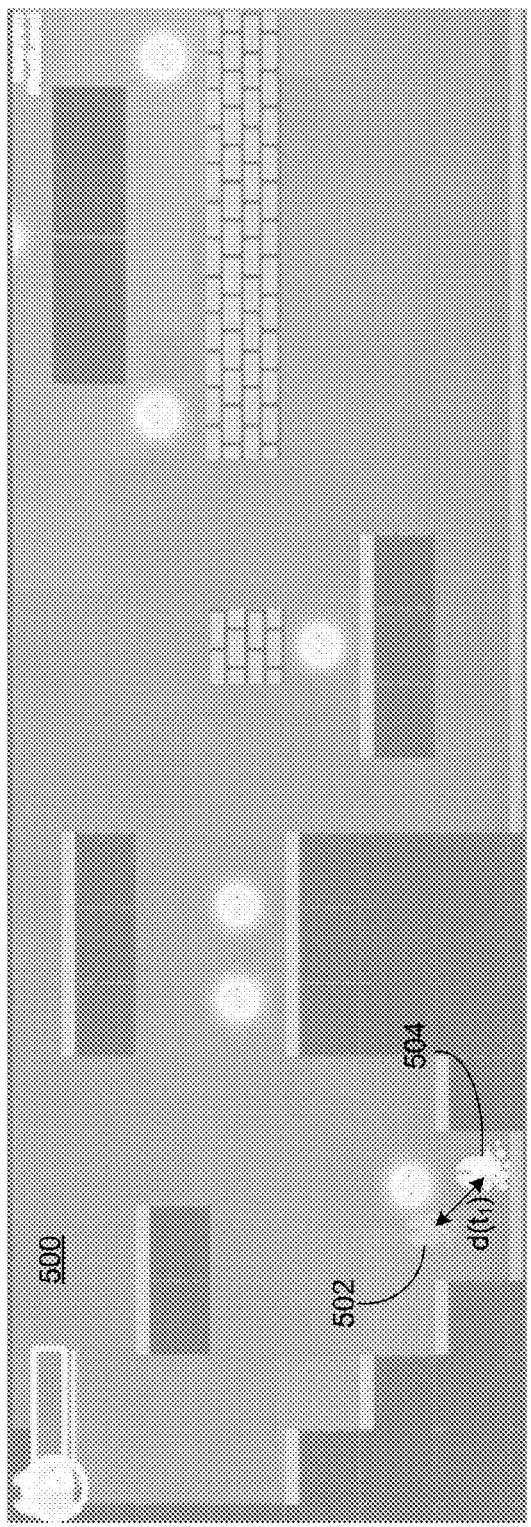
FIG. 5 presents graphical representations of game telemetry data in accordance with an embodiment of the present disclosure.
Figure 5:
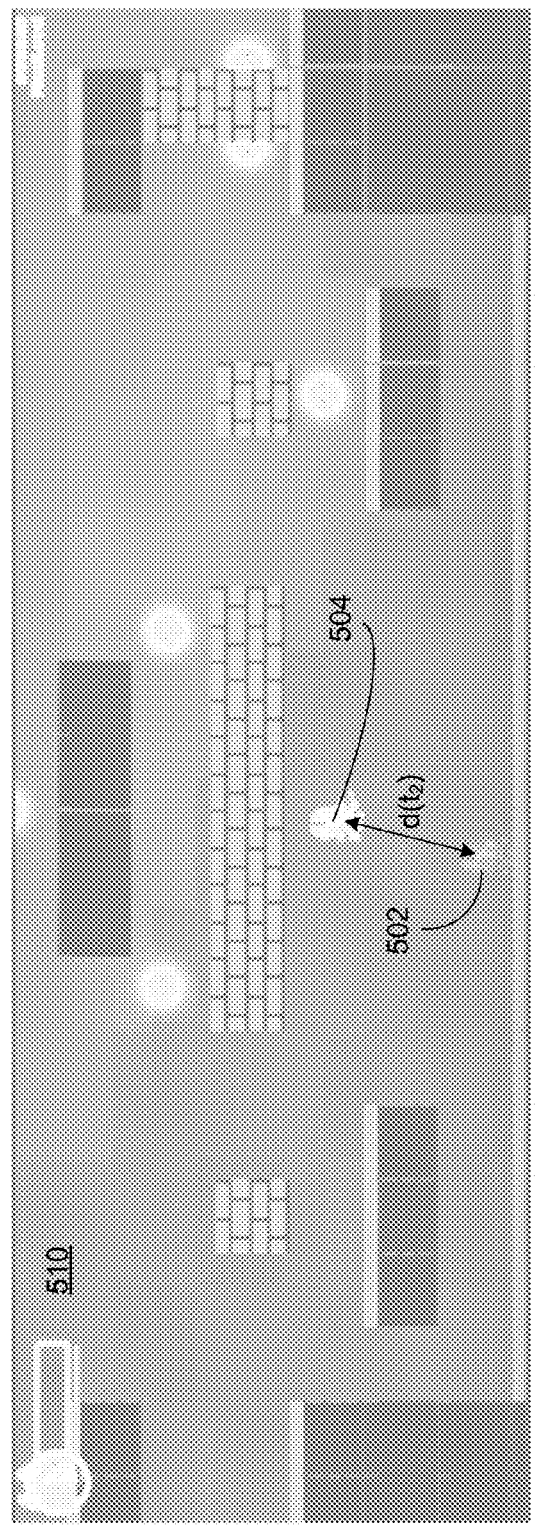

FIG. 5 presents graphical representations 500 and 510 of game telemetry data in accordance with an embodiment of the present disclosure. In particular, game telemetry data in the form of actual game output is presented in diagram 500 at a time $t_1$ and in diagram 510 at time $t_2$. The game telemetry data includes a character 502 that is generated by a gaming bot model such as a gaming bot 250, another AI persona or other AI. The game telemetry data also includes a character 504 that is generated by an actual player, such as a master player that the gaming bot model is trying to mimic or simulate.

The game development application 246 generates the difference between the position of the character 502 and the position of character 504. In the example shown in game telemetry data 500, the difference at time $t_1$, $d(t_1)$, is measured as the Euclidean distance between the centroid of characters 502 and 504. In the example shown in game telemetry data 510, the difference at time $t_2$, $d(t_2)$, is measured as the Euclidean distance between the centroid of characters 502 and 504. Considering a time period $t_0$-$t_n$, corresponding to, for example, the length of time it took for the master player to complete a level, the length of time of the sample of the master players play trace or some other time interval, difference data can be generated by integrating or summing the values of $d(t_i)$ for i=0, n.

Difference data generated in this fashion can be used as a measure of fit to update the gaming bot to more closely imitate the master player. For example, a gaming bot 250 can use reinforcement learning to learn how to "shadow" the human master player, while also learning from the environment how to cope with new, unseen conditions. A distance measurement from the master to the shadow is used to understand how close it is to replicating the human behavior. It should be noted that values $d(t_i)$ can be linear distance measurements, logarithmic distance measurements or distance measurements transformed by some other nonlinear function. Furthermore, while described above as Euclidean distances, other distances including non-Euclidean distances can likewise be employed.

While described above in terms of an accumulated distance measurement, the difference data can include one or more other measurements in addition to or as an alternative to distance, such as the difference in accumulated game score between the gaming bot and the human player during the time period $t_0$-$t_n$, the difference in game achievements between the gaming bot and the human player during the time period $t_0$-$t_n$, a time difference in reaching a game goal between the gaming bot and the human player during the time period $t_0$-$t_n$, a difference in other game metrics or other game analytics between the gaming bot and the human player and/or any combination thereof.

Figure 6:
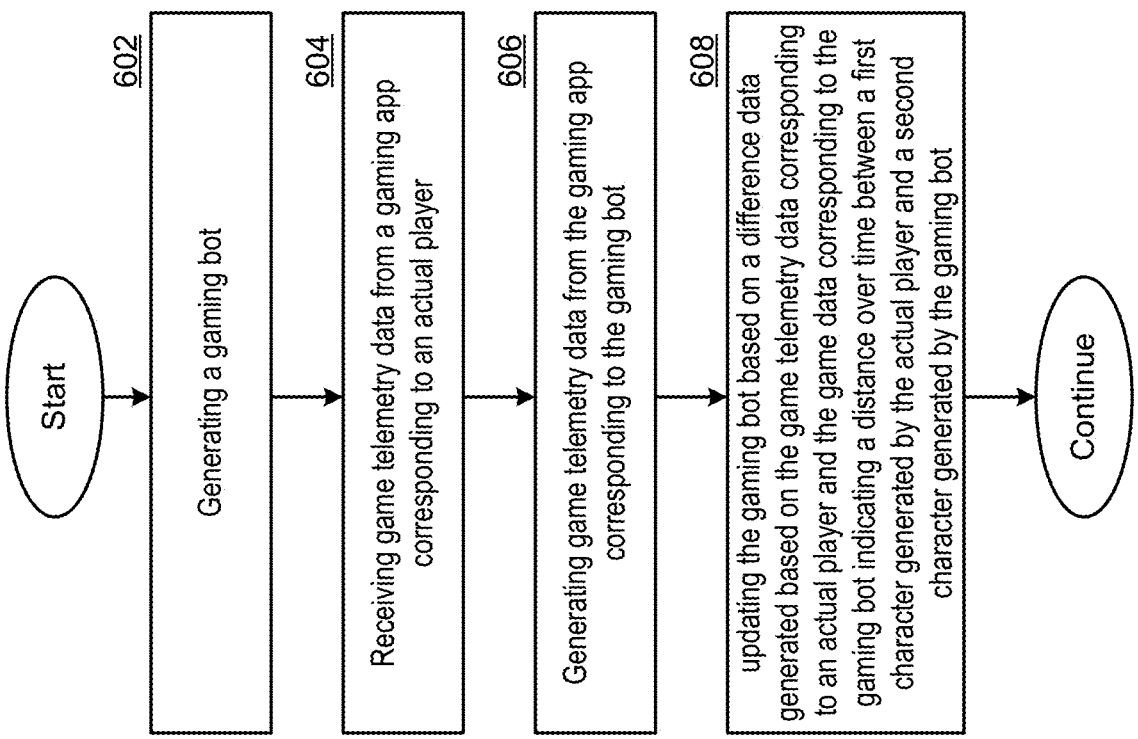
FIG. 6 presents a flowchart representation of a method in accordance with an embodiment of the present disclosure.

FIG. 6 presents a flowchart representation of a method in accordance with an embodiment of the present disclosure. In particular, a method is presented for use with any of the functions and features described in conjunction with FIGS. 1-2, 3A, 3B, 4 and 5. Step 602 includes generating a gaming bot. Step 604 includes receiving game telemetry data from a gaming app corresponding to an actual player. Step 606 includes generating game telemetry data from the gaming app corresponding to the gaming bot.

Step 608 includes updating the gaming bot based on a difference data generated based on the game telemetry data corresponding to an actual player and the game data corresponding to the gaming bot indicating a distance over time between a first character generated by the actual player and a second character generated by the gaming bot.

Figure 7:
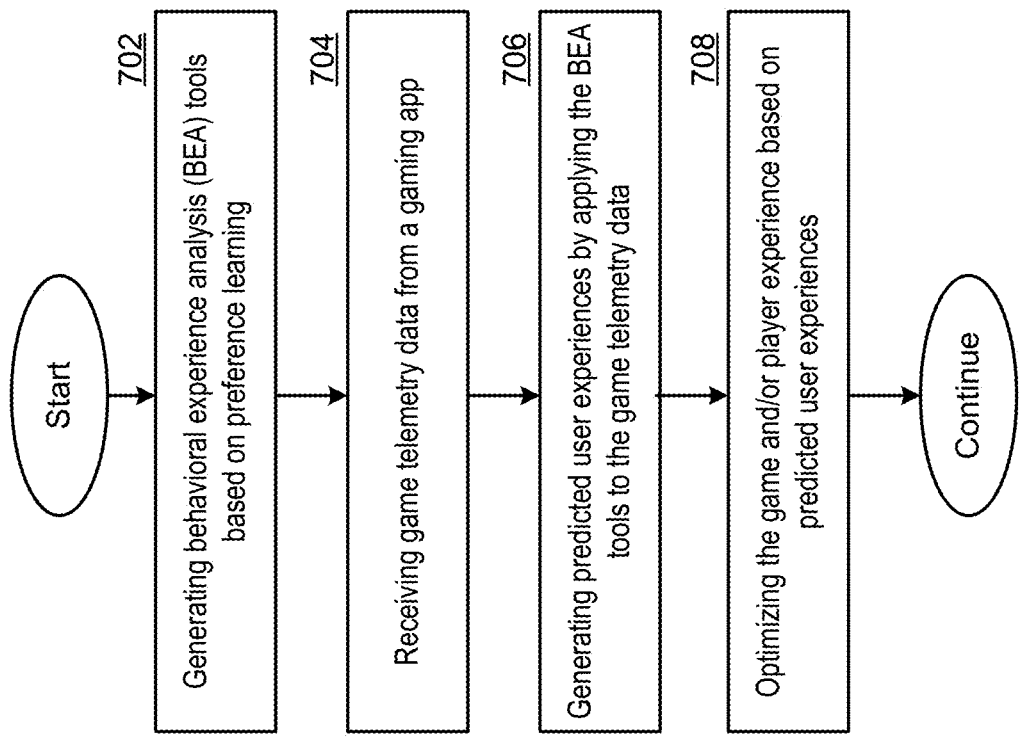
FIG. 7 presents a flowchart representation of a method in accordance with an embodiment of the present disclosure.

FIG. 7 presents a flowchart representation of a method in accordance with an embodiment of the present disclosure. In particular, a method is presented for use with any of the functions and features described in conjunction with FIGS. 1-2, 3A, 3B, and 4-6. Step 702 includes generating behavioral experience analysis (BEA) tools based on preference learning. Step 704 includes receiving game telemetry data from a gaming app. Step 706 includes generating predicted user experiences, such as motivations and/or behaviors, by applying the BEA tools to the game telemetry data. Step 708 includes optimizing the game and/or the player experience based on the predicted user motivations and/or behaviors.

Figure 8:
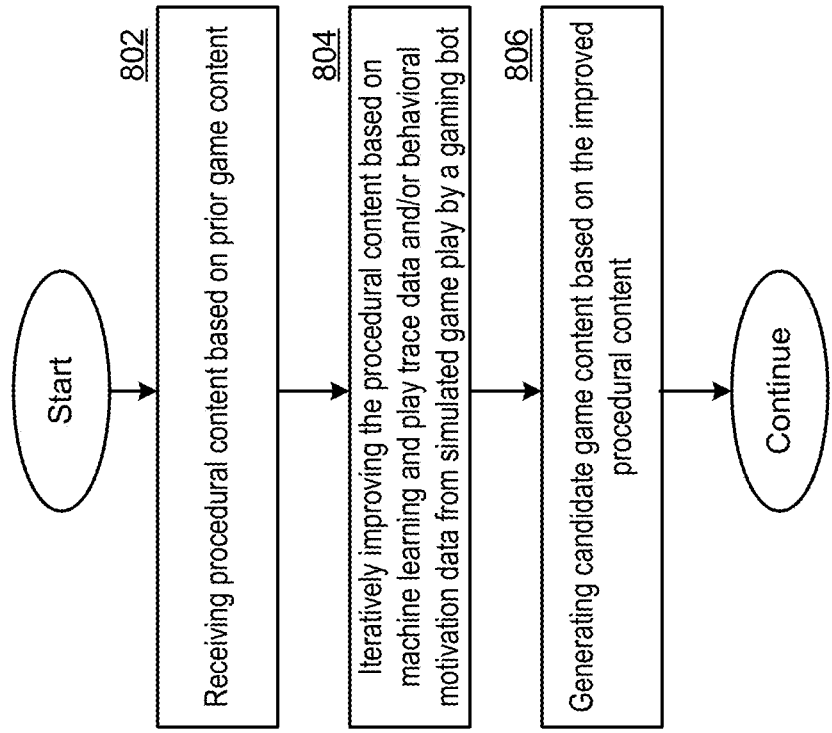
FIG. 8 presents a flowchart representation of a method in accordance with an embodiment of the present disclosure.

FIG. 8 presents a flowchart representation of a method in accordance with an embodiment of the present disclosure. In particular, a method is presented for use with any of the functions and features described in conjunction with FIGS. 1-2, 3A, 3B, and 4-7. Step 800 includes receiving, via a system including a processor, procedural content based on prior game content. Step 804 includes iteratively improving, via the system, the procedural content based on machine learning and play trace data and/or behavioral motivation data from simulated game play by a gaming bot. Step 806 includes generating, via the system, candidate game content based on the improved procedural content.

Figure 9:
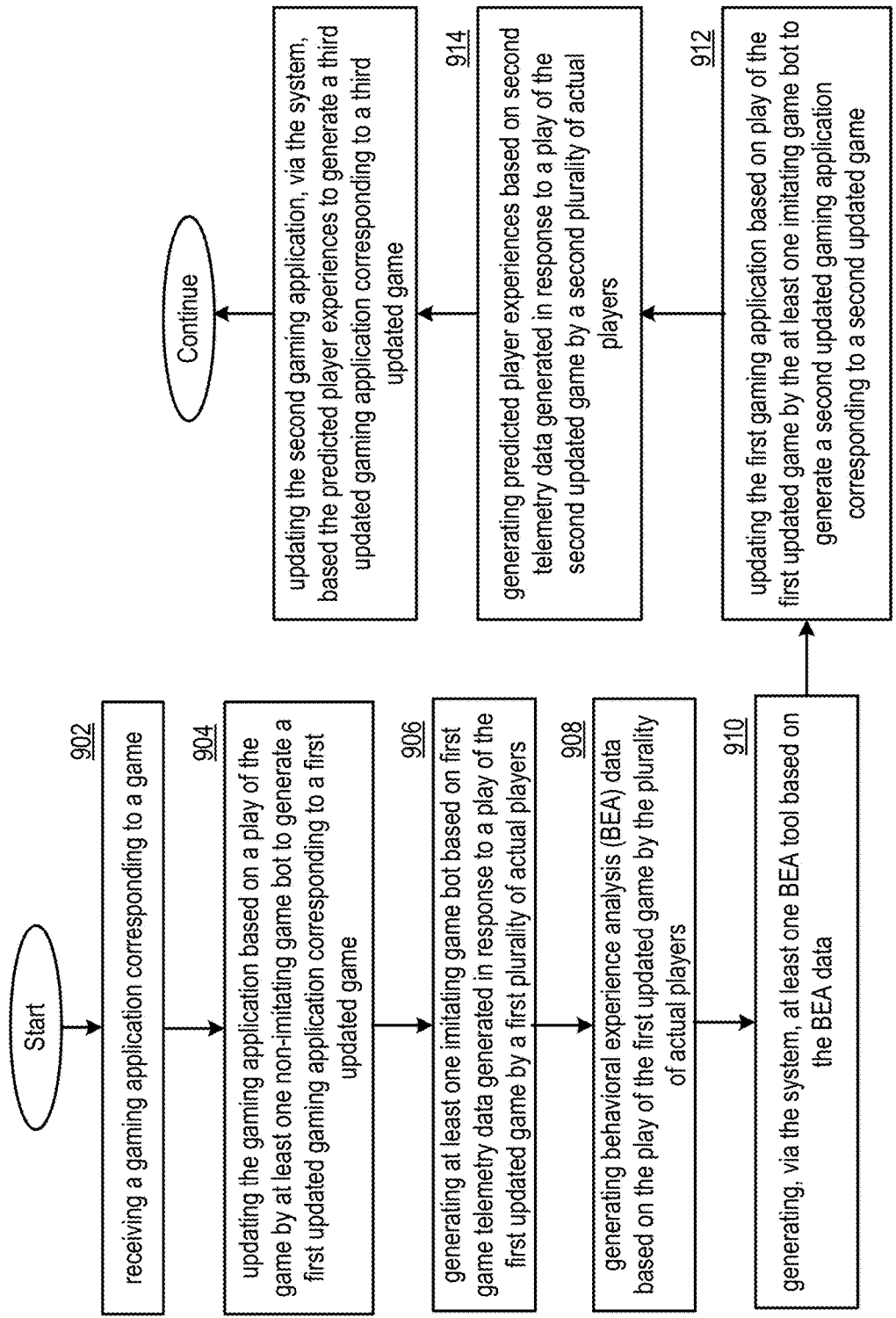
FIG. 9 presents a flowchart representation of a method in accordance with an embodiment of the present disclosure.

FIG. 9 presents a flowchart representation of a method in accordance with an embodiment of the present disclosure. In particular, a method is presented for use with any of the functions and features described in conjunction with FIGS. 1-2, 3A, 3B, and 4-8. Step 902 includes receiving, via a system including a processor, a gaming application corresponding to a game. Step 904 includes updating the gaming application, via the system, based on a play of the game by at least one non-imitating game bot to generate a first updated gaming application corresponding to a first updated game. Step 906 includes generating, via the system, at least one imitating game bot based on first game telemetry data generated in response to a play of the first updated game by a first plurality of actual players. Step 908 includes generating, via the system, behavioral experience analysis (BEA) data based on the play of the first updated game by the first plurality of actual players. Step 910 includes generating, via the system, at least one BEA tool based on the BEA data. Step 912 includes updating the first gaming application, via the system, based on play of the first updated game by the at least one imitating game bot to generate a second updated gaming application corresponding to a second updated game. Step 914 includes generating predicted player experiences, via the system, based on second telemetry data generated in response to a play of the second updated game by a second plurality of actual players. Step 916 includes updating the second gaming application, via the system, based the predicted player experiences to generate a third updated gaming application corresponding to a third updated game.

Figures 10A, 10B:
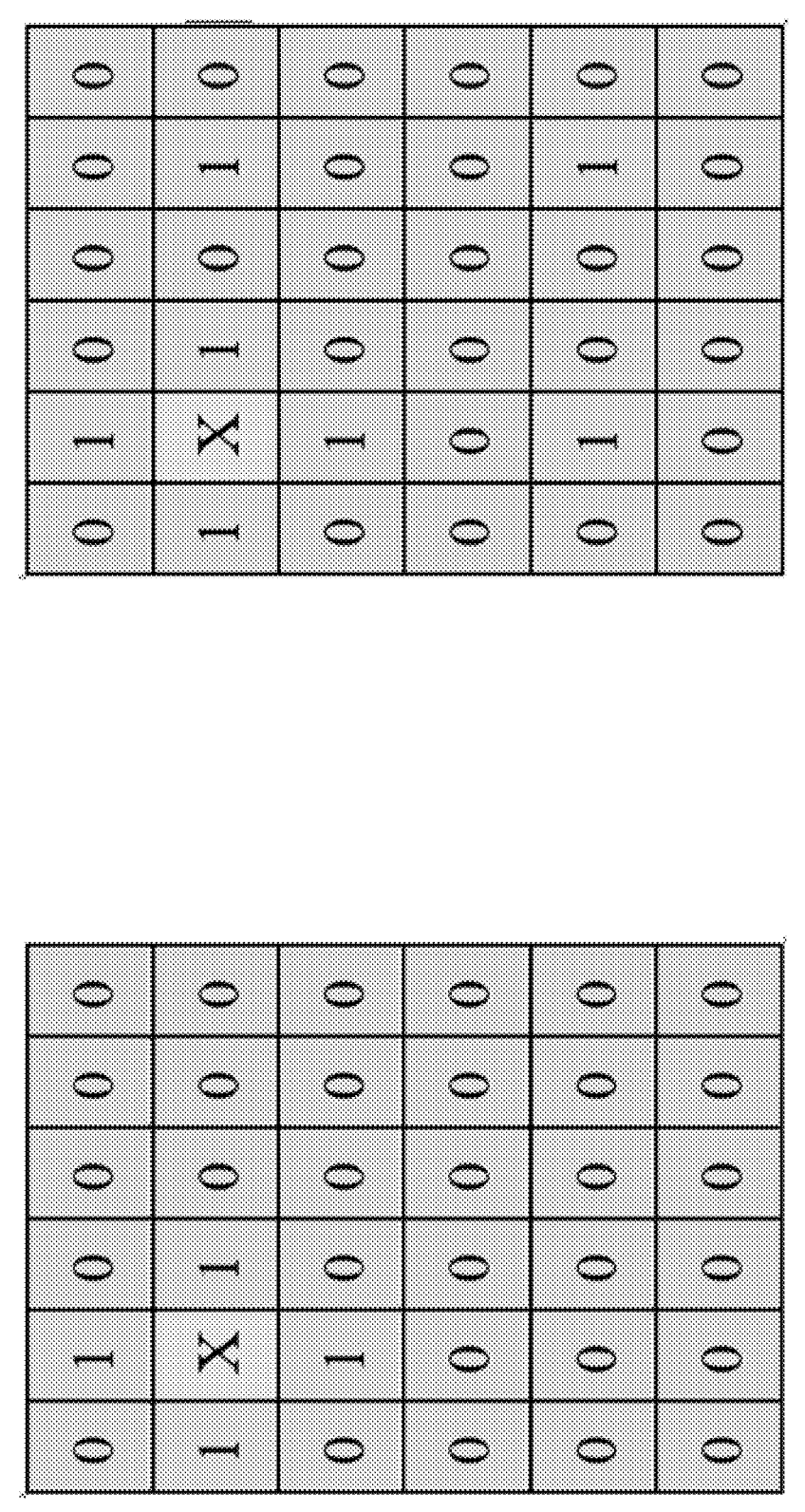

FIGS. 10A and 10B present graphs in accordance with embodiments of the present disclosure. As previously discussed, PCG tools 252 can generate new puzzles, levels or other content by learning from examples provided by the game developer to the game development platform 125 to seed the artificial intelligence model and generate new candidate content for evaluation. In particular, PCG tools 252 can employ machine learning models as content generators for games. In various examples, PCGML uses machine learning algorithms to learn the appropriate invariants of the content it is trained on, so that the content sampled from the learned model retains the "style" of the content, while introducing variety in new levels. For example, if trained on platform game levels, the model can learn the maximal lengths of gaps it can generate to still obtain playable levels, but to also introduce new challenges and scenarios (e.g. combinations of gaps) not found in the original levels. This use of PCG tools 252 allows game developers using the game development platform 125 to increase their productivity with pre-generated puzzles, levels and/or other content; to focus on concepts and important details rather than mundane layouts; to start creating from generated examples instead of a blank canvas, and/or generate content in the style and preferences learned from prior game developer based on the seed examples provided by the game developer to the game development platform 125.

In various embodiments, symmetrical Markov Random Field (SMRF) models can be used to generate new game content in conjunction with the artificial intelligence of the PCG tools 252 of the game development platform 125. Markov Random Fields (MRFs) can be used to model relationships between variables in a graph by modeling the probability of a random variable X (which corresponds to vertex in the graph) taking a value given the neighbors of the variable. Or P(X=x|neighbors(X)). In such cases, MRFs typically use a local neighborhood defined as 4 or 8 pixels/grid positions adjacent to the current pixel/grid position.

Other approaches have explored non-local neighbors for MRFs, and dynamic neighborhoods. In particular, some approaches have used longer range dependencies, and the specific neighbors chosen vary depending on the content of the patches around the current variable and the potential other neighbors. Some approaches have used long range neighbors defined by including nodes at increasing distances from the current position. However, these neighborhood functions do not change based on content or spatial location in the graph. Some approaches have used adaptive neighborhoods for each variable based on the strength of the relationship between the current variable and other variables in a predefined area. However these approaches are constrained to a predefined local area when defining the neighborhood, rather than neighbors at arbitrary distances.

The symmetrical MRFs introduced herein modify the standard MRF neighborhood formulation by including symmetric positions in the graph in addition to local neighbors. SMRFs define different neighbors based on the spatial relationships between variables in the graph, and not on the content. This results in an MRF neighborhood that includes non-local neighbors and is able to capture specific symmetrical relationships in the graph. This makes the methods described herein more suited for generative tasks, where the content of each variable may not be well defined initially. Furthermore, while MRFs have been used in image and texture processing tasks such as image denoising, image infilling, and signal reconstruction, the methods discussed herein, in contrast, present improvements to the field of game content generation including image synthesis, game level generation, and other content synthesis. The result improves the technology of game development via automatic game content generation that is quicker and more accurately imitates the content and features of existing games.

Standard Markov Random Field Definition:
Formally: Given an undirected graph, G=<V, E>, a set of random variables, X, corresponding to the vertices, V form a Markov Random Field if the Markovian properties are satisfied:
 1. Pairwise Markov Property: any two non-adjacent variables are conditionally independent
 2. Local Markov Property: a variable is conditionally independent of all other variables, given its neighbors
 3. Global Markov Property: any two subsets of variables are conditionally independent given a separating set of variables Informally: A Markov Random Field is defined by a neighborhood structure that defines which variables in the graph are dependent on one another. This essentially models the relationships between a variable and its neighbors.

Commonly, MRFs use a neighborhood of spatially local nodes in the graph. E.g., X is the current variable/vertex, 1's are the dependent variables/vertices, and 0's are independent of X as shown in the example graph of FIG. 10A.

A Symmetric Markov Random Field Extension:

The SMRF models employed herein can employ a local MRF neighborhood that uses a neighborhood of spatially local nodes in the example graph of FIG. 10A as well as a global neighborhood potentially including distant symmetric positions in the graph as shown in FIG. 10B. E.g., X is the current variable/vertex, 1's are the dependent variables/vertices, and 0's are independent of X. This shows the network structure with horizontally, vertically, and diagonally symmetric nodes.

The differences between the SMRF and standard MRF, are that
 1. The SMRF uses non-local neighbors in the network structure; and
 2. In the SMRF, the network positioning of the neighboring vertices/variables in relation to the current vertex changes depending on the position of the current vertex in the graph. i.e., the local neighbors stay the same, but the symmetric neighbors may be very distant or very near the current vertex depending on its distance from the center of the graph.

Figure 10C:
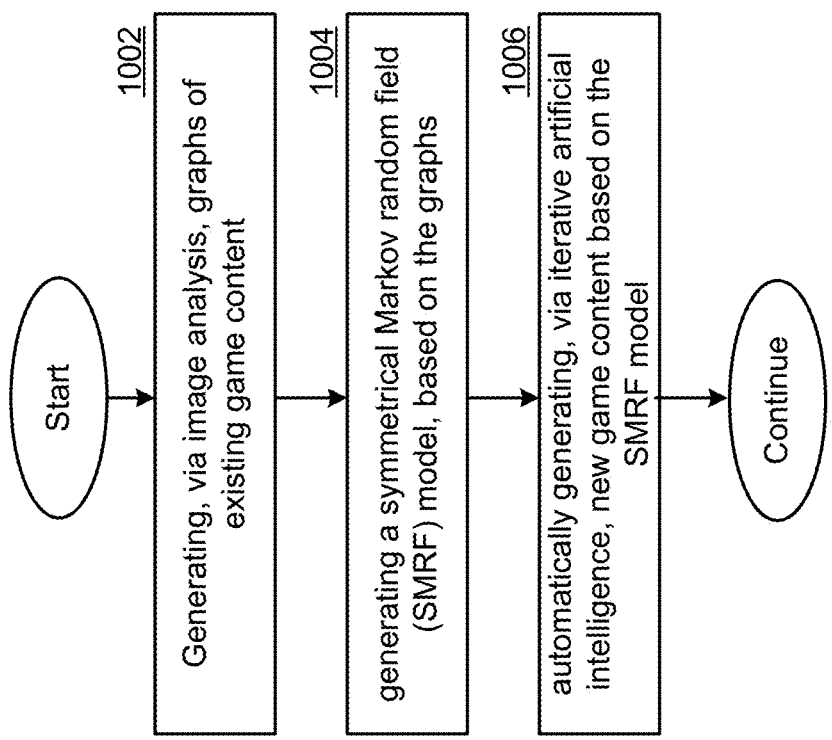
FIG. 10C presents a flowchart representation of a method in accordance with an embodiment of the present disclosure.

FIG. 10C presents a flowchart representation of a method in accordance with an embodiment of the present disclosure. A method is presented for use with any of the functions and features described in conjunction with FIGS. 1-2, 3A, 3B, and 4-9. In particular, a method is presented that uses Symmetrical Markov Random Field models to generate new game content in conjunction with the PCG tools 252 or other use of the game development platform 125.

Step 1002 includes generating, via image analysis, graphs of existing game content. Step 1004 includes generating a symmetrical Markov random field (SMRF) model, based on the graphs. Step 1006 includes automatically generating, via iterative artificial intelligence, new game content based on the SMRF model.

In various embodiments, each of the graphs of the existing game content represents positions of a plurality of game elements in the existing game content. The SMRF model can include a conditional probability distribution that indicates subsets of the plurality of game elements that are likely to be positioned within a predetermined distance to one another in the graph.

Step 1006 can include: selecting a candidate graph based on frequencies of occurrence of the plurality of game elements; generating an improved candidate graph based on the SMRF model; and generating the new game content based on the improved candidate graph. The improved graph can be generated based on a Metropolis-Hastings sampling or other AI-based technique.

Step 1006 can include: generating candidate new game content based on the improved candidate graph; testing the candidate new content via game play utilizing a gaming bot—such as one or more of the gaming bots 250; and accepting the candidate new game content as the new game content, based on the game play utilizing the gaming bot. In this fashion, when the gaming bot or bots determine that the new game content is playable (e.g. has no dead-ends, infinite loops, is possible to complete) and furthermore has a predicted user experience that is greater than a user experience threshold, it can be accepted as viable new content. The use of artificial, rather than human intelligence, allows the gaming bots 250 to perform with a speed and consistency that cannot practically be performed in the human mind, and further improve the technology of game development.

Various embodiments including several optional functions and features can be further described in conjunction with the examples that follows.

Figure 11B:
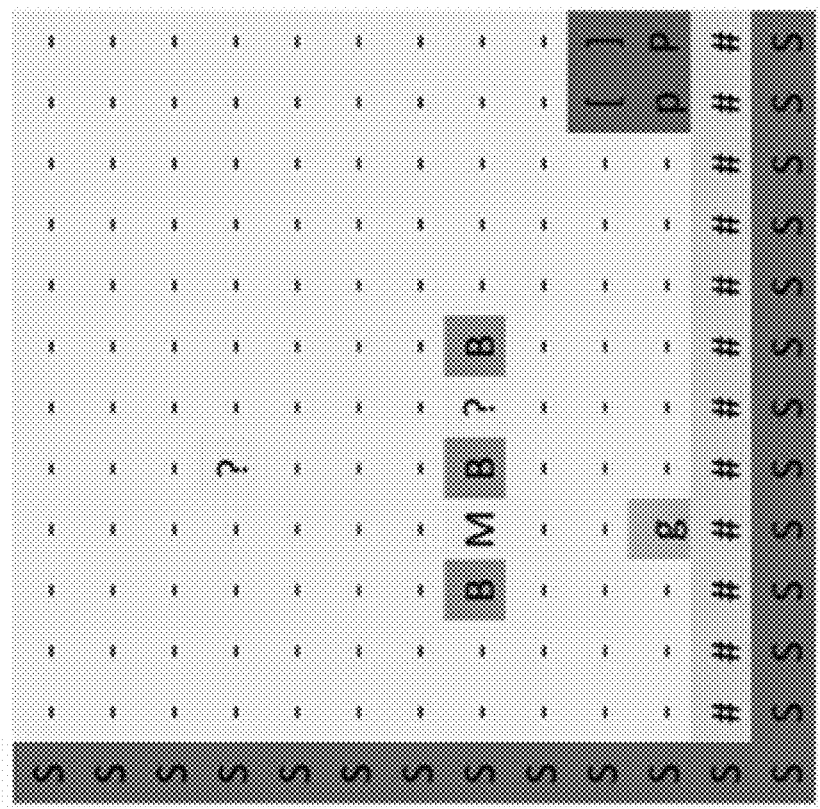
FIG. 11B presents a graphical representation of the existing game in accordance with an embodiment of the present disclosure.
Figure 11A:
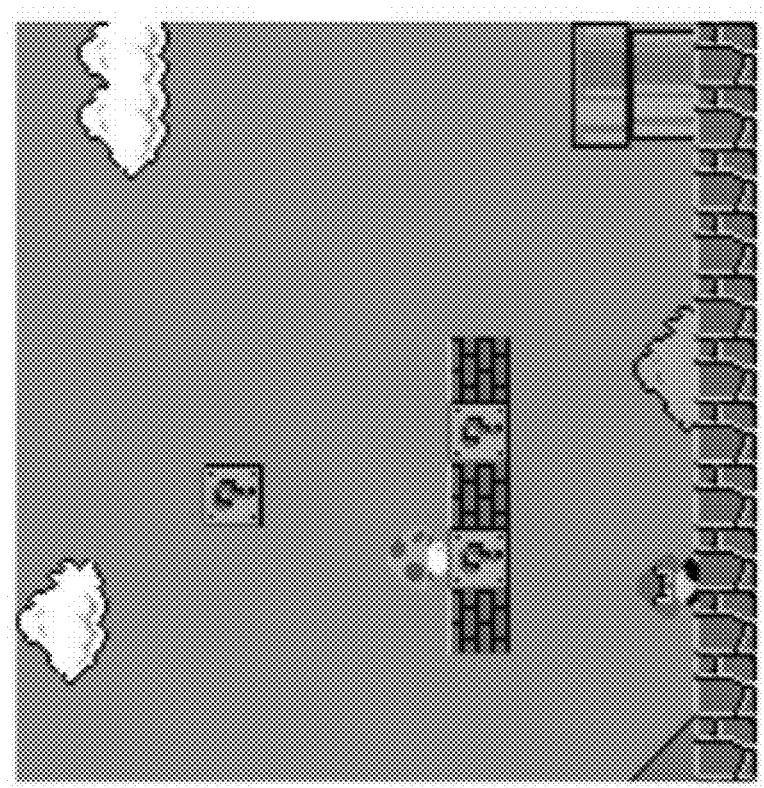
FIG. 11A presents a pictorial representation of an existing game in accordance with an embodiment of the present disclosure.

Consider the case of modeling and generating video game levels for 2D games. To do this, the method takes an image of a level, and converts it to graph, such as a tile-based grid representation of the different game elements in a tile grid array. In the example shown, the image is analyzed via an image analysis such as a computer vision model, pattern recognition technique or other artificial intelligence model that assigns a unique symbol to each type of game element present in each grid square of the image. For example, a section of a level of the game Super Mario Brothers is presented in FIG. 11A is used for training based on the 13×13 graph representation (that can also be referred to as an array or tile grid) presented in conjunction with FIG. 11B. In the example shown the following, the following symbols are used to represent the indicated types of game elements:
  B=brick
  M=mushroom power-up
  G=enemy
  ?=element of hidden type
  #=ground
  p P [ ] (collectively over a 2×2 region of tiles)=pipe Notice that sentinel tiles "s" are added to denote the boundaries of the level in the grid. While sentinel boundaries are used on the left and bottom edges of the graph, sentinel tiles could likewise be positioned on the upper and right boundaries as well. Furthermore, tiles corresponding to "empty" elements of the game such as clouds, sky, foliage, etc., can be assigned a common symbol "–" indicating they are not active game elements. In the example above, certain games elements are represented by a common symbol that can represent multiple game element types/subtypes. For example, the "G" represents any of a number of enemy types, the "M" represents any of a number of types of power-ups, the "?" represents any of a number of elements that can be hidden including coins of different values, power-ups of different types, etc. In other examples, individual symbols could be used to uniquely represent each specific type of game element. In this fashion, a "M6" could represent a sixth type of power-up, a "?C3" could represent a third coin value that is hidden, a G9 could represent a ninth type of enemy, etc. In either case, this process can be repeated for a number of game images of an existing game in order to build a training data set of tile grids/graphs that represent the existing game.

In various embodiments, machine learning is used to model the relationship between the different tile types and/or subtypes (either generally or specifically) and their corresponding (e.g. relative) positions in the existing game. In particular, a SMRF model is trained on tile grids of the training data set, learning the relationships between the different tile types/subtypes and positions versus neighboring grid positions that may be local and may also include symmetrical and possibly non-local neighbors. For example, the SMRF model indicates subsets of the plurality of game elements that are likely to be positioned within a predetermined distance to one another in the graph and results in a conditional probability distribution that describes which tile types are typically located near each other or relative to one another in specific configurations—as presented by the training data set of tile grids from the existing game.

Figure 11D:
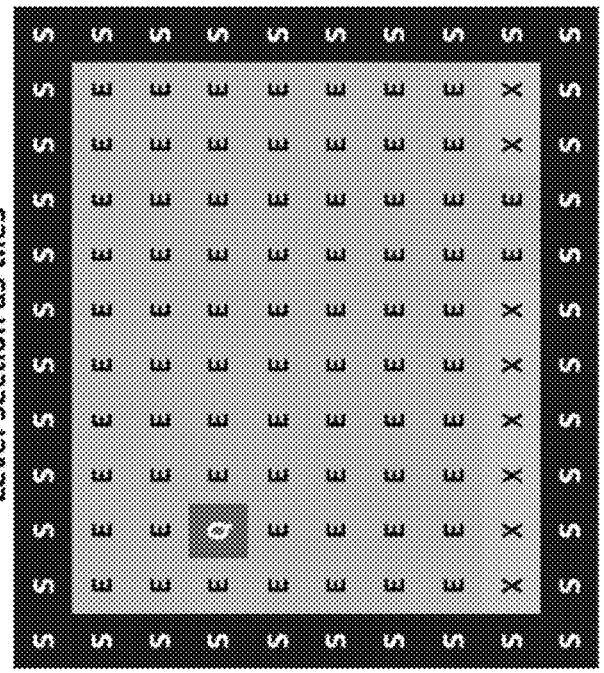
FIG. 11D presents a graphical representation of the existing game in accordance with an embodiment of the present disclosure.
Figure 11C:
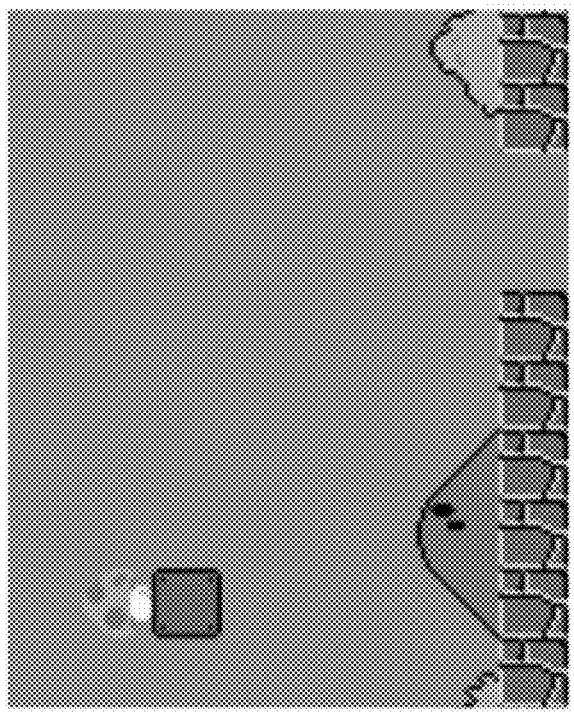
FIG. 11C presents a pictorial representation of an existing game in accordance with an embodiment of the present disclosure.

Consider the further example presented of a local MRF model in conjunction with FIGS. 11C and 11D. A section of a level of the game Super Mario Brothers is presented in FIG. 11C is used for training based on the 10×12 graph representation presented in conjunction with FIG. 11D. In the example shown, the following symbols are used to represent the indicated types of game elements:
  E=empty
  Q=power block
  X=ground
  S=boundary Consider a neighborhood defined by the following relative grid positions:

| 0 | 1 | 0 |
| 1 | 2 | 1 |
| 0 | 1 | 0 | where 2 represents a current grid position, grid positions 1 are included in the neighborhood and grid positions 0 are not included in the neighborhood. The possible combinations of tiles at the four 1 positions yield a configuration for each possible current tile position 2. The occurrences of these configurations can be accumulated in for the graph of FIG. 11D for all possible current locations 2. The results are presented in the table of FIG. 11E. The conditional probabilities for each of the neighborhood configurations in the model are presented in the table of FIG. 11F. While the neighborhood used in the example above is based on a local MRF model, an SMRF model can likewise be used to generate conditional probabilities for corresponding configurations as previously discussed.

The method can then employ an iterative search algorithm such as Metropolis-Hastings sampling or other iterative artificial intelligence technique to generate one or more new levels. For example, the method first randomly fills a tile grid with different tile types/subtypes according to their overall frequency in the training data (e.g., 70% empty tile types, 15% ground types, 10% enemies, 5% powerups, etc.). The method then randomly chooses two positions in the graph, computes, based on the conditional probabilities of the SRMF model, the likelihood of the tile configurations at those positions, and the likelihood of the tiles if the positions were to be swapped. If the swapped likelihood is higher, the method keeps them swapped. The method iterates this many times (e.g., many thousands of times, 100's of thousands of times or more), until the overall likelihood of the level is above a threshold or otherwise within a predetermined range.

In effect, PCGML operates to inherently learn invariant patterns from a set of examples of an existing game. The type and scale of patterns captured is largely determined by the underlying machine learning approach, the training data, and its representation. The term "patterns" has different connotations in different domains, but the term generally describe regularities within a given object. In the context of frequent pattern mining, this is taken to mean sets of items, sub-sequences or sub-structures that occur multiple times. In games, the most prominent use of patterns is in game design patterns that can take many shapes, including rather abstract patterns related to the overall game design, but also more fine-grained and visible spatial patterns, that define particular relations between tiles that can be learned by the PCGML.

Consider the following additional example that focuses on Candy Crush Saga (CCS), which is a free-to-play match-three puzzle game released by King in 2012 and has since enjoyed major success as one of the top mobile casual games. In CCS, three or more candies (tiles) can be matched horizontally or vertically with neighboring candies of the same color. When matched, candies disappear from the board. If there are no obstructing items, this causes existing candies to fall down and fill the resulting gaps, and new candies with random colors to be spawned (usually at the top of the board). The game introduces various constraints, obstacles and objectives that together define each level and thus create puzzles of varying difficulty. In the context of CCS, the following terms can be used:

Global pattern: A pattern that can only be identified by looking at spatial structure of all elements on the game board.

Local pattern: A pattern that can be identified in a small area of the game board.

CCS levels often exhibit global patterns commonly considered aesthetically pleasing or interesting to the human eye. Examples include placing items on the board in recognizable shapes or in symmetric arrangements (see e.g., areas of the blue squares of FIG. 12B). There are also levels which repeat smaller, local patterns. A common example is that candies with additional beneficial effects are enclosed by obstructing items, making them harder to use (see e.g., areas of the red and green squares of FIG. 12A). Levels can display both local and global patterns. The global aspect of CCS is different from other applications of PCGML, such as Super Mario brothers, where local tile neighborhoods can be used define many of the primary game elements (gaps, pipes, enemy groups, etc.). For this reason, PCGML is employed on CCS to inherently learn different types of patterns, including, for example, both local and global patterns. Consider the following three approaches described in detail in the sections that follow.

1. Enriching the Data

One way to encourage the generation of specific types of patterns is to enrich the data used for training. An explicit way of doing so is by labelling each example with the type of global pattern displayed. Conditional generative adversarial networks (GANs) are an example of AI techniques that are well suited to handle this kind of data. Models can also be trained on each class separately. Both options aim to strengthen the signals around global patterns that are present in the data. Furthermore, a data-driven approach can be employed to enrich data and used to identify class labels automatically using unsupervised learning. If limited labeled data is available, a corresponding approach with a classifier that encodes a learned bias is also possible.

2. Augmenting the Algorithm

A further strategy to improve a model is to augment the algorithm to ensure it focuses on one or more desired patterns. If domain knowledge is available, this can be done explicitly by modifying the structure of the model to detect the desired patterns. For example, to generate MRF models with symmetry, positions can be added that should be mirrored at a given position as input to the algorithm.

Another approach is to feed measures describing desired features (e.g. a symmetry score) to the algorithm, so that recognizing the fitness of an individual based on desired features is facilitated. This can be done, for example, by giving additional inputs to a GAN's discriminator. While these approaches can generate content exhibiting the desired features, they can be reliant on domain knowledge and the ability to characterize the features numerically.

Instead of relying on domain knowledge, another approach is to ensure that the input at least allows the algorithm to make connections between items at the scale of the desired global pattern. An example of this data-driven approach is to add a fully-connected layer as the first layer of the discriminator in a GAN. Another approach is to add the position of each input (e.g., as coordinates) to the input of a neural network. Between these two extremes lie approaches with a learned bias. Such a bias can be learned through labeled samples or adversarial training and then given to the model as an additional input.

3. Filtering the Solutions

A third approach is filtering solutions, which is most straightforward if done explicitly, but it is conceivable to learn desired patterns and ways to identify them. Filtering can be executed at different times during the training process. Before training would mean creating a representation that only encodes solutions with the desired global patterns. In case of symmetry, for example, only half of the level could be generated and automatically mirrored to construct the final level. Repairing solutions to adhere to patterns (e.g., through mirroring) is also possible during or after training. A further option for filtering after training is applying a search algorithm to the space of generated content, e.g., a latent vector evolution for GANs.

Continuing with the example of PCGML for CSS, note that CCS contains approximately 80 game elements with different characteristics. Some levels rely on unique mechanics or game elements, which makes them difficult to replicate. For this reason, a subset of published CCS levels can be selected for training that are more homogeneous. In particular, levels were selected from a specific game mode (Jelly) and levels were discarded containing complex dynamic elements such as frogs and conveyor belts, resulting in the 504 levels used for training. There are still 51 unique items present in the reduced set of levels. Some items can be stacked on the same cell in the board, and 789 unique item stacks were present in this training data set.

The following abstract representation for CCS levels was generated to reduce the representation complexity:

SHAPE: Indicates which game board cell are non-void.
REGULAR: The six types of regular candy that can be matched with other candies of the same color.
SPECIAL: Match-able items with additional effects
BLOCK: Items that obstructs matches by occupying a cell
JELLY: Items indicating cells where matches need to occur to win the level in Jelly game mode.
LOCK: Items that obstructs matches by restricting movement of items in the same cell With the six categories mentioned above, each level is represented as a matrix with dimensions 9×9×6 with a binary encoding to represent the occurrence of an item category in a given cell.

In order to be able to ensure the validity of the generated CCS levels, the following post-processing method can be introduced. The first four layers cannot coexist in the same cell. The choice for each cell is determined by selecting the layer with highest value. However, if none of the values is higher than a threshold (0.5 for example), the cell is indicated empty. Further, only allow locks to be placed on cells that are not void or empty and jelly is only placed on cells that are not void.

In order to keep the complexity of the level representation low, the following post-processing steps can be added to all levels, including original ones: (1) Candies are spawned through candy cannons. Candy cannons are not included in this representation, so they are automatically placed above non-void cells in order to ensure that new candies are dropped. (2) Additional, complex dynamic elements such as portals and special candy cannons are removed from the game to avoid introducing unnecessary complexity. (3) further game meta-data such as the number of available moves in the representation is not included.

Figure 12B:
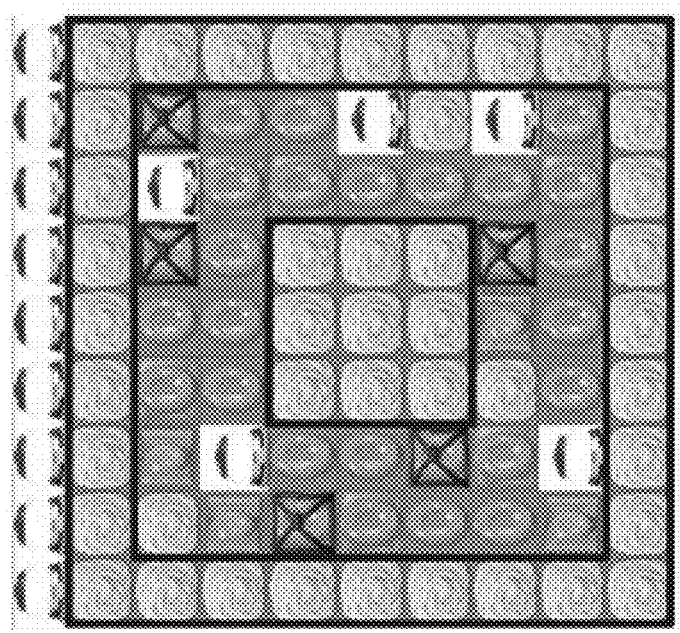
FIG. 12B presents a pictorial representation of an existing game in accordance with an embodiment of the present disclosure.
Figure 12A:
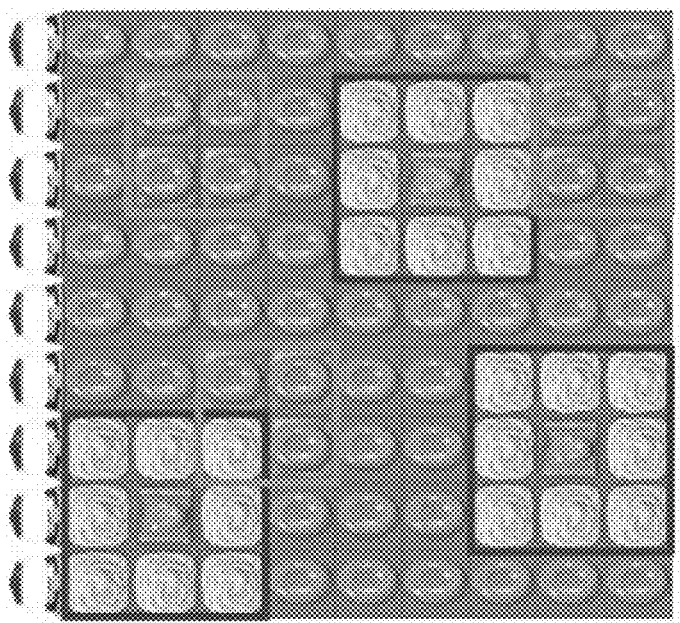
FIG. 12A presents a pictorial representation of an existing game in accordance with an embodiment of the present disclosure.
Figure 12D:
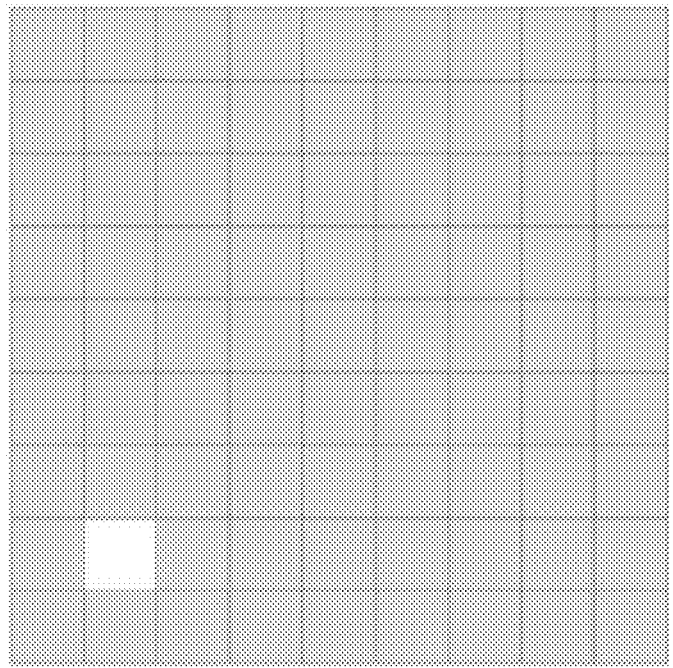
FIG. 12D presents a graphical representation of the existing game in accordance with an embodiment of the present disclosure.
Figure 12C:
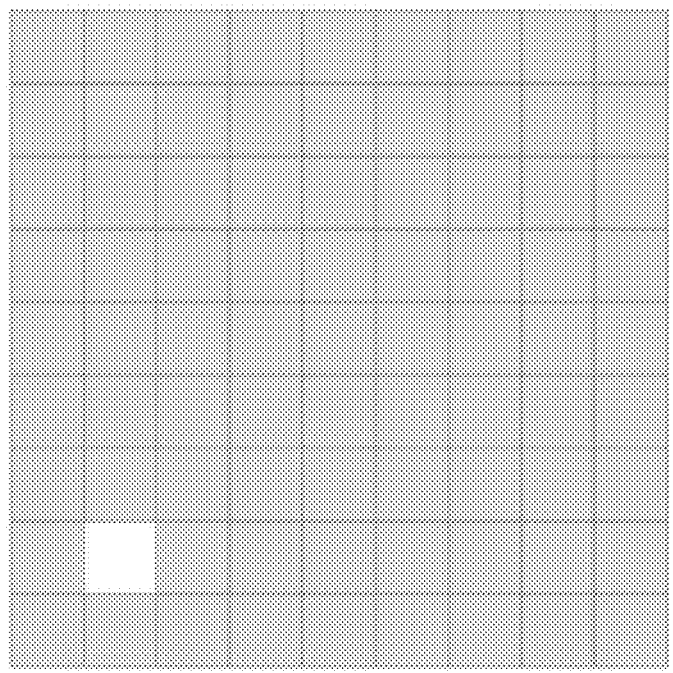
FIG. 12C presents a graphical representation of an existing game in accordance with an embodiment of the present disclosure.

Two different MRF techniques were evaluated, a routine referred to as LocalMRF—an MRF conforming to the sample neighborhood of FIG. 12C and a routine referred to as GlobalMRF—an SMRF that includes both local and non-local symmetrical neighbors conforming to the sample neighborhood of FIG. 12D. To use these models with CCS, the six-layer representation is collapsed into a single-layer representation where the value at a position is the concatenation of values in each layer. In this way, each possible combination of values for the six layers is treated as a distinct tile type.

The levels generated by LocalMRF result in very low scores for horizontal and vertical symmetry given the strictly local neighborhood of the model, and consequently, greater dissimilarity to conventional CSS levels. Extending the neighborhood with symmetric neighbors (GlobalMRF) noticeably increases the symmetry scores along the horizontal and vertical axes and results in greater similarity to conventional CSS levels.

Two different GAN techniques were also evaluated. A first GAN model discriminator employs filters that produce 9×9 patches—in the case of CCS is the entire level. A first variant is trained on the full set of levels (GlobalGAN), and a second variant is trained on only vertically symmetric levels (GlobalGAN-vert). It should be noted that, in other variants, two streams of convolution could be employed, one with 9×9 filters for global patterns and one with 3×3 filters for local patterns. Results indicate that GlobalGAN generates average scores across the board, however a definite improvement in vertical symmetry is achieved by training only on vertically symmetric levels using (GlobalGAN-vert). However, the score improvement is not major, which may be because most of the original levels are already vertically symmetric.

As previously discussed, gaming bots can further validate candidate levels generated in this fashion, by determining that the new game content is playable and has a predicted user experience that is greater than a user experience threshold. This use of artificial, rather than human intelligence, to perform various elements of this process allows the PCG tools 252 to perform with a speed, accuracy and consistency that cannot practically be performed in the human mind. While several of the examples have been described above in terms of a single process that is based on conditional tile type probabilities, the process above can be repeated in a hierarchical fashion to first consider tile types and then perform an expanded sampling based on subtypes of selected tile types. Furthermore, AI bots can be used to evaluate particular subtypes of selected tile types in order to enhance or maximize predicted measures of viewer/user experience.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A game development platform comprising:
  a machine that includes:
    a processing circuit; and
    a non-transitory computer readable storage medium configured to store a gaming application and further operational instructions that, when executed by the processing circuit, cause the processing circuit to perform operations that include:
      generating, via image analysis utilizing the machine, graphs of existing game content;
      generating a symmetrical Markov random field (SMRF) model, wherein the SMRF model is implemented via the machine and trained via machine learning, based on the graphs; and
      automatically generating, via iterative artificial intelligence (AI) implemented via the machine, new game content based on the SMRF model.

2. The game development platform of claim 1, wherein each of the graphs of the existing game content represents positions of a plurality of game elements in the existing game content.

3. The game development platform of claim 2, wherein the SMRF model includes a conditional probability distribution that indicates subsets of the plurality of game elements that are likely to be positioned within a predetermined distance to one another in the graphs.

4. The game development platform of claim 2, wherein iterative AI operates by:
  selecting a candidate graph based on frequencies of occurrence of the plurality of game elements;
  generating an improved candidate graph based on the SMRF model; and
  generating the new game content based on the improved candidate graph.

5. The game development platform of claim 4, wherein the improved candidate graph is generated based on a Metropolis-Hastings sampling.

6. The game development platform of claim 4, wherein generating the new game content based on the improved candidate graph includes:
  generating candidate new game content based on the improved candidate graph;
  testing the candidate new content via game play utilizing a gaming bot; and
  accepting the candidate new game content as the new game content, based on the game play utilizing the gaming bot.

7. The game development platform of claim 6, wherein the game play is AI simulated game play of the new game content performed by the gaming bot.

8. The game development platform of claim 6, wherein the candidate new game content is accepted as the new game content when a predicted user experience associated with the game play exceeds a threshold.

9. The game development platform of claim 6, wherein the candidate new game content is accepted as the new game content when the game play indicates that the new game content is playable.

10. A method for implementing a procedural content generation tool comprises:
  generating, via image analysis, graphs of existing game content;
  generating a symmetrical Markov random field (SMRF) model based on the graphs; and
  automatically generating, via iterative artificial intelligence (AI) implemented via a machine, new game content based on the SMRF model, wherein the iterative artificial intelligence implemented via the machine, includes:
    generating candidate new game content
    testing the candidate new content via game play utilizing a gaming bot trained via machine learning to imitate a player, wherein the game play is AI simulated game play of the new game content performed by the gaming bot; and
    accepting the candidate new game content as the new game content, based on the game play utilizing the gaming bot.

11. The method of claim 10, wherein each of the graphs of the existing game content represents positions of a plurality of game elements in the existing game content.

12. The method of claim 11, wherein the SMRF model includes a conditional probability distribution that indicates subsets of the plurality of game elements that are likely to be positioned within a predetermined distance to one another in the graphs.

13. The method of claim 11, wherein the SMRF model is trained via machine learning based on the graphs.

14. The method of claim 11, wherein iterative AI operates by:
  selecting a candidate graph based on frequencies of occurrence of the plurality of game elements;
  generating an improved candidate graph based on the SMRF model; and
  generating the new game content based on the improved candidate graph.

15. The method of claim 14, wherein the improved candidate graph is generated based on a Metropolis-Hastings sampling.

16. The method of claim 10, wherein the candidate new game content is accepted as the new game content further when a predicted user experience associated with the game play exceeds a threshold.

17. The method of claim 10, wherein the candidate new game content is accepted as the new game content further when the game play indicates that the new game content is playable.

* * * * *